(12) United States Patent
Kawai et al.

(10) Patent No.: US 8,271,423 B2
(45) Date of Patent: Sep. 18, 2012

(54) OPTIMUM ROUTE SEARCHING APPARATUS, METHOD AND RECORDING MEDIUM THAT DETERMINES SEARCH TERMINATION FOR ROUTES IN ACCORDANCE WITH THE ROUTE OF INTERCONNECTED NODES

(75) Inventors: Katsura Kawai, Tokyo (JP); Yuuki Okada, Kawasaki (JP); Shingo Fujii, Yokohama (JP); Hiroki Yabu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 850 days.

(21) Appl. No.: 12/389,494

(22) Filed: Feb. 20, 2009

(65) Prior Publication Data
US 2009/0248609 A1 Oct. 1, 2009

(30) Foreign Application Priority Data
Feb. 21, 2008 (JP) .................... 2008-040444

(51) Int. Cl.
*G06F 17/00* (2006.01)
*G06N 7/00* (2006.01)
*G06N 7/08* (2006.01)

(52) U.S. Cl. .................................................. 706/55

(58) Field of Classification Search .......... 703/3; 706/55
See application file for complete search history.

(56) References Cited

U.S. PATENT DOCUMENTS
2007/0038415 A1* 2/2007 Okada et al. ................ 703/1

FOREIGN PATENT DOCUMENTS

| | | | |
|---|---|---|---|
| GB | 2 429 806 A | 3/2007 |
| JP | 9-50454 A | 2/1997 |
| JP | 9-160961 A | 6/1997 |
| JP | 9-167173 A | 6/1997 |
| JP | 2001-177934 A | 6/2001 |
| JP | 2002-078128 A | 3/2002 |
| JP | 2006-195544 A | 7/2006 |
| JP | 2007-52495 A | 3/2007 |
| KR | 10 2005 0077641 A | 8/2005 |

OTHER PUBLICATIONS

'A genetic approach to the cable harness routing problem': Conru, 1994, IEEE, 0-7803-1899-4, pp. 200-205.*
'A design expert system for auto-routing of ship pipes': Kang, 1999, Journal of ship production.*
Japan patent publication 2007-052495, Hironori.*
H. Fujita et al., "Visualization Tool Using 3-D Database Centerized", Apr. 2002, 4 pgs.

* cited by examiner

*Primary Examiner* — Kakali Chaki
*Assistant Examiner* — Peter Coughlan
(74) *Attorney, Agent, or Firm* — Foley & Lardner LLP

(57) ABSTRACT

An optimum route searching apparatus, method and recording medium make it possible to obtain the optimum cable laying route in a short period of time. The optimum route searching apparatus includes an external storage device for storing search data comprising information related to a route that has a node as a connection point; a simplification device for creating simplified data by extracting information related to a node constituting a branching point, a bending point and a terminal point; a connection information creation device for creating a connection information file of cable laying route based on the simplified data; and a searching device for searching for an optimum cable laying route candidate based on the connection information file. The search termination determination determines search termination for all routes in accordance with the route of interconnected nodes from the start point to either the end point or the dead end having been written to all cards by a card writing device.

10 Claims, 37 Drawing Sheets

FIG. 15

| NO. | CABLE NO. | EQUIPMENT INFORMATION OF "FROM" SIDE | | | EQUIPMENT INFORMATION OF "TO" SIDE | | | CABLE LENGTH (m) |
|---|---|---|---|---|---|---|---|---|
| | | EQUIPMENT NO. | EQUIPMENT NAME | INSTALLATION AREA | EQUIPMENT NO. | EQUIPMENT NAME | INSTALLATION AREA | |
| 1 | CABLE001 | PANEL001 | CONTROL PANEL Y | CENTRAL CONTROL ROOM | PUMP001 | PUMP A | TURBINE BUILDING | 357 |
| 2 | CABLE002 | PANEL002 | CONTROL PANEL Y | CENTRAL CONTROL ROOM | PUMP002 | PUMP B | TURBINE BUILDING | 341 |
| 3 | CABLE003 | PANEL003 | CONTROL PANEL Y | CENTRAL CONTROL ROOM | TANK001 | TANK C | YARD | 384 |
| 4 | CABLE004 | PANEL004 | CONTROL PANEL Z | CENTRAL CONTROL ROOM | PANEL101 | FIELD PANEL D | TURBINE BUILDING | 136 |
| 5 | CABLE005 | PANEL005 | CONTROL PANEL Z | CENTRAL CONTROL ROOM | SENSOR001 | SENSOR E | YARD | 86 |
| ... | ... | ... | ... | ... | ... | ... | ... | ... |

| BASE LINE NAME | DIRECTION | OFFSET VALUE FROM THE ORIGIN | AREA NAME |
|---|---|---|---|
| XA | X | -27000 | CCB(LV-SWGR) |
| XB | X | -7000 | CCB(LV-SWGR) |
| Y1 | Y | 118700 | CCB(LV-SWGR) |
| Y2 | Y | 149500 | CCB(LV-SWGR) |
| Z1 | Z | 6150 | CCB(LV-SWGR) |
| Z2 | Z | 11650 | CCB(LV-SWGR) |

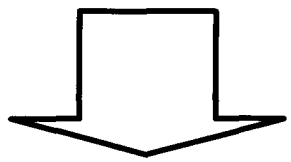

(B)
```
N1 (Start/end point), N51 (Branch), N52 (Branch), N99 (Start/end point)
N51 (Branch), N80 (Start/end point)
N51 (Branch), N4 (Corner), N6 (Corner), N52 (Start/end point)
N52 (Branch), N81 (Start/end point)
```

FIG. 19

| Node name | Coordinates (X, Y, Z) | Kind |
|---|---|---|
| N1 | | Blank (Start/end point) |
| N51 | | Branch |
| N52 | | Branch |
| N99 | Omitted | Blank (Start/end point) |
| N80 | | Blank (Start/end point) |
| N4 | | Corner |
| N6 | | Corner |
| N81 | | Blank (Start/end point) |

FIG. 24

First card <N1, N51> <= Encounter branching point

Update of first card <N1, N51, N52> <= Encounter branching point

Second card <N1, N51, N4, N6, N52> <= Encounter branching point

Update of First card <N1, N51, N52, N99> <= Reached end point

Third card <N1, N51, N52, N6, N4> <= Dead end

Update of second card <N1, N51, N4, N6, N52, N99> <= Reached end point

FIG. 25

First card <N1, N51> <= Encounter branching point

Update of first card <N1, N51, N52> <= Encounter branching point

Second card <N1, N51, N4, N6, N52> <= Encounter branching point

Update of First card <N1, N51, N52, N99> <= Reached end point

Third card <N1, N51, N52, N6, N4> <= Dead end

Update of second card <N1, N51, N4, N6, N52, N99> <= Reached end point

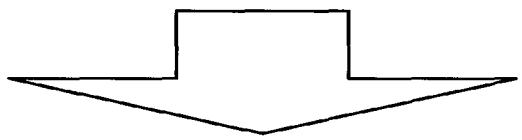

First and second cards = Cable laying route candidates

OPTIMUM ROUTE SEARCHING APPARATUS, METHOD AND RECORDING MEDIUM THAT DETERMINES SEARCH TERMINATION FOR ROUTES IN ACCORDANCE WITH THE ROUTE OF INTERCONNECTED NODES

CROSS-REFERENCE TO RELATED APPLICATIONS

The present application is based upon and claims the benefit of priority from prior Japanese Patent Application No. 2008-40444, filed Feb. 21, 2008, the entire contents of which is incorporated herein by reference.

TECHNICAL FIELD

The present invention relates to an optimum route searching apparatus, method and program for deciding a route for laying a cable such as a power cable, a control cable.

RELATED ART

A variety of types of cables, such as power cables, control cables and so forth must be laid in ordinary buildings and power plants (thermal, nuclear, and hydro). Deciding the optimum route for laying these types of cables is not easy.

This is because of the large amount of data that must be grasped to decide this cable laying route, such as the layout of the machinery, equipment and control panels inside the building or power plant, and the physical relationships of the cable trays and conduits in which the cables are to be laid. Further, for example, even if a lot of this data is available, planning the optimum cable route on the basis of this data requires tremendous labor, knowledge and experience.

Thus, the difficulties in deciding the optimum cable laying route may actually result in problems like the length of the cable being longer than needed in a cable laying route that has already been determined. In this case, actual costs may differ greatly from the planned costs at the time of the design, causing revenues to differ from initial estimates.

To deal with this problem, conventional technology that makes it possible to carry out optimum cable route searches and to tabulate cable quantities based on the results thereof are disclosed in Japanese Patent Application Laid-open No. 9-50454, Japanese Patent Application Laid-open No. 9-160961, Japanese Patent Application Laid-open No. 9-167173, and Japanese Patent Application Laid-open No. 2007-052495.

However, in the prior art such as that mentioned above, when searching for a cable laying route involves a huge volume of data, throughput declines, making it impossible to quickly obtain an optimum cable laying route. Further, in the prior art such as that mentioned above, the search data and search conditions may be unable to produce an optimum cable laying route, but measures to deal with this situation are not considered, leaving the user with no way of obtaining any information.

SUMMARY OF INVENTION

The present invention has been devised to solve for the problems of such above-mentioned prior art, and the principle object of the present invention is to provide an optimum route searching apparatus, method and program that make it possible to obtain the optimum cable laying route in a short period of time regardless of the quantity of search data.

A further object of the present invention is to provide an optimum route searching apparatus, method and program for obtaining some sort of cable laying route regardless of the search data or search conditions.

To achieve the above-mentioned objects, an optimum route searching apparatus of the present invention for searching for the optimum cable laying route has the following technical features.

That is, the optimum route searching apparatus of the present invention has search data storage means for storing search data comprising information related to a route that has a node as a connection point; simplification means for creating simplified data by extracting, from among the information related to the above-mentioned route, information related to branching point, bending point and terminal point nodes; connection information creation means for creating cable laying route connection information based on the simplified data; and searching means for searching for optimum cable laying route candidates based on the above-mentioned connection information. The searching means has search route card writing-type searching means, and search termination determination means. The search route card writing-type searching means has card creation means for creating a card into which sequentially connected nodes are written, and card writing means for writing to the card a route of interconnected nodes from a start point to either an end point or a dead end. The search termination determination means determines search termination for all routes in accordance with the route of interconnected nodes from the start point to either the end point or the dead end having been written to all cards by the card writing means.

In the above-described present invention, simplifying the search data may greatly reduce the amount of data used in the search, thereby shortening the time required for a search, and making it possible to obtain the optimum cable laying route in a short period of time.

According to the present invention, it is possible to provide an optimum route searching apparatus, method and program capable of obtaining the optimum cable laying route in a short period of time regardless of the amount of search data.

BRIEF DESCRIPTION OF DRAWINGS

FIG. 15 is a diagram showing an example of a cable list file;

FIG. 18 is a diagram showing an example of a simplified Linkage sheet;

FIG. 19 is a diagram showing an example of a simplified Node sheet;

FIG. 24 is a diagram showing an example of a card description by search route card writing-type searching means;

FIG. 25 is a diagram showing an example of a card description by search route card writing-type searching means;

DESCRIPTION OF EMBODIMENTS

Figure 1:
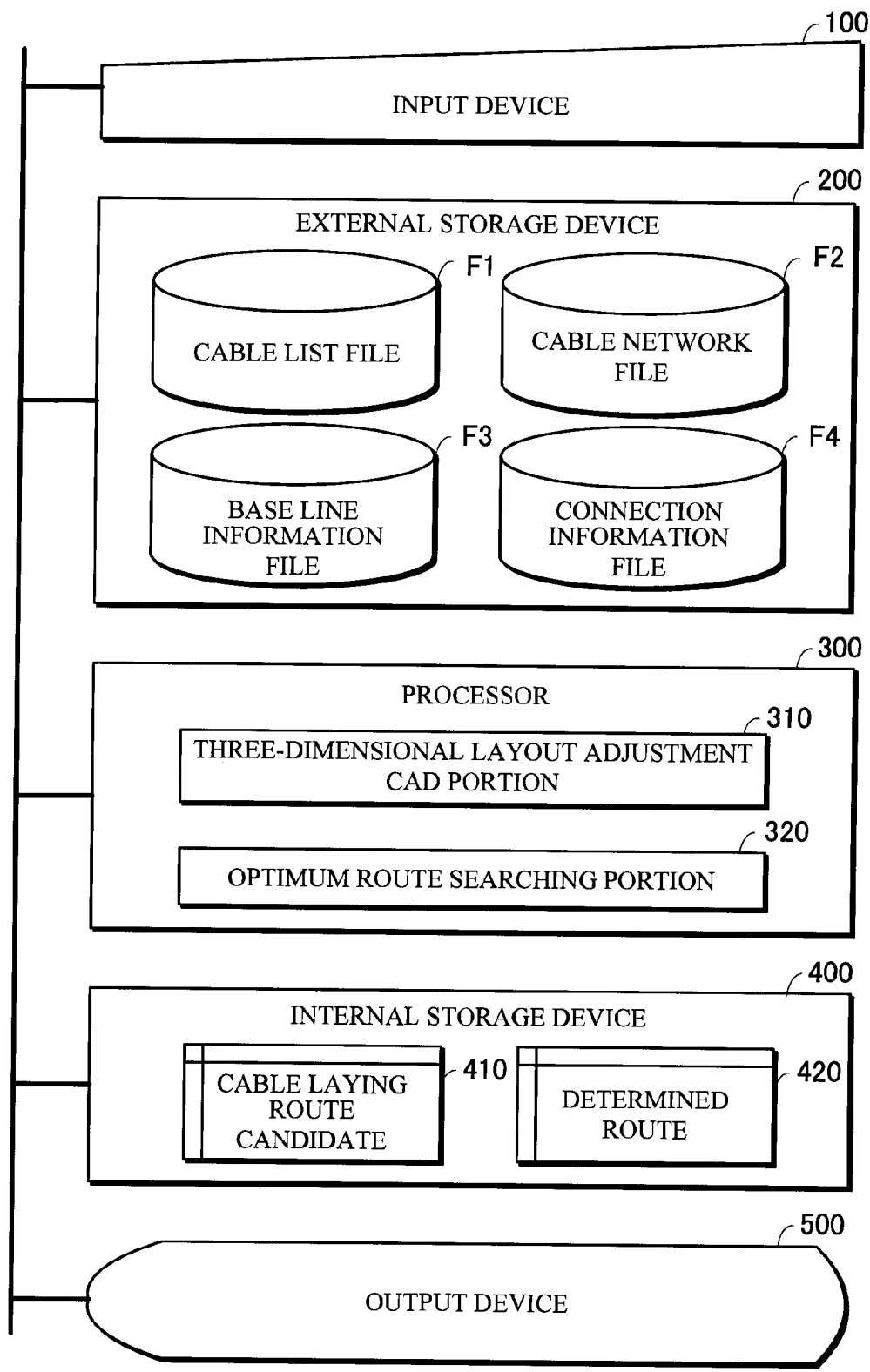
FIG. 1 is a block diagram showing the basic configuration of the optimum route searching apparatus of the present invention.

The embodiments of the present invention will be explained in detail below by referring to the drawings.

[Overview of Embodiment]

First, an overview of the embodiment will be explained by referring to the block diagram of FIG. 1 and the schematic diagrams of FIGS. 15 through 17. This embodiment is realized by controlling a computer in accordance with a prescribed program. Specifically, as shown in FIG. 1, this embodiment comprises an input device 100; an external storage device 200; a processor 300; an internal storage device 400; and an output device 500. In particular, the processor 300 functions as the optimum route searching portion 320 in accordance with the running of a prescribed program.

The input device 100 is means for inputting information in accordance with a user operation. For example, a mouse, keyboard, and monitor touch panel are typical input devices 100. The external storage device 200 is a large-capacity auxiliary storage device. For example, a hard disk drive is a typical external storage device 200. In this embodiment, the external storage device 200 functions as means for storing search data needed to search for a cable laying route, such as a cable list file F1, a cable network file F2, a base line information file F3, and a connection information file F4.

The cable list file F1, for example, as shown in FIG. 15, is a file in which information for identifying areas denoting specific areas of the start point (From) side and the end point (To) side, and information for identifying either equipment or control panels, as well as cable specifications, such as cable length (may also include the type of cable, voltage value, and so forth) is recorded.

Figures 16, 17:
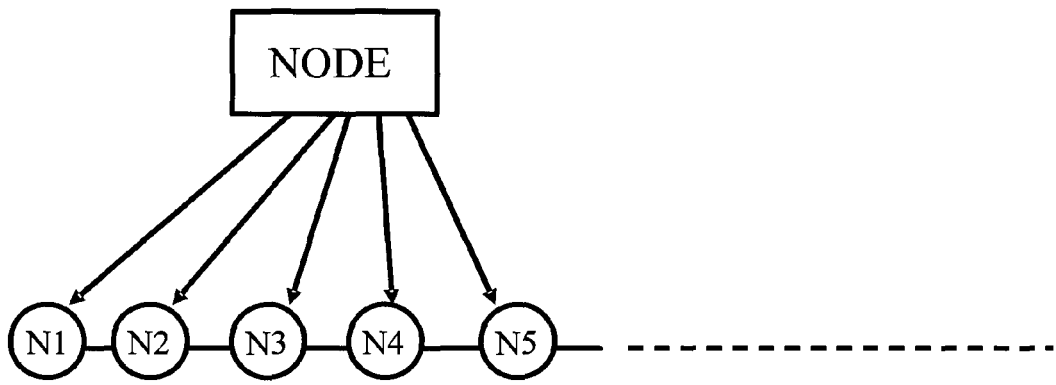
FIG. 16 is a diagram showing node connections in a cable network file.
FIG. 17 is a diagram showing an example of base line information file.

The cable network file F2, as shown in FIG. 16 for example, is a file comprising connection information denoting individually named node connections, and information related to the coordinate values (X, Y, Z) of the respective nodes, and the types of nodes. Type of node information may include at least the identifications of a branching point (Branch), a bending point (Corner), a terminal point (either the start point or the end point), and other points.

The base line information file F3, as shown in FIG. 17 for example, is a file in which three-dimensional coordinate information of all the areas is recorded in accordance with the base line, which uses a center line (core) to denote a row of construction materials (path). In the example of FIG. 17, the base line information is made up of base line name, direction, offset value coordinates from the point of origin, and affiliated area name. This base line information file F3 is used for examining a point in proximity to either the start point or the end point.

The internal storage device 400 is a memory that the processor 300 is able to access directly, and functions as means for storing the processing results of the processor 300, such as a cable laying route candidate 410, a determined route 420, and so forth. Furthermore, both the external storage device 200 and the internal storage device 400 may be used arbitrarily as means for storing the above-mentioned files, and processing results and other such information.

The processor 300 functions as an optimum route searching portion 320 that searches for the optimum route in accordance with an operation based on the above-mentioned variety of information and program. Further, the processor 300 also functions as a three-dimensional layout adjustment CAD portion 310 for creating the above-mentioned files F1 through F3.

The output device 500 is display means for displaying a file and information, such as the search results. A CRT and LCD are a typical output devices 500. Further, the output device 500 may also comprise a device like a speaker for outputting the optimum cable laying route using sound, or a device like a printer for outputting the optimum cable laying route in accordance with printing. Furthermore, all sorts of devices capable of being used either now or in the future may be utilized as the devices mentioned above, and these devices are not limited to the examples that have been given.

An optimum route searching method that is realized in accordance with this above-described embodiment is one that creates a connection information file that simplifies the cable list file F1, cable network file F2 and base line information file F3, and decides the optimum cable laying route on the basis of this connection information file. In this embodiment, the optimum cable laying route can be determined at this time by taking into account the shortest route, as well as whether or not the cable passes through specified via points, and whether or not the cable is capable of being installed into the cable tray.

(1. First Embodiment)
(1-1. Configuration)

Figure 2:
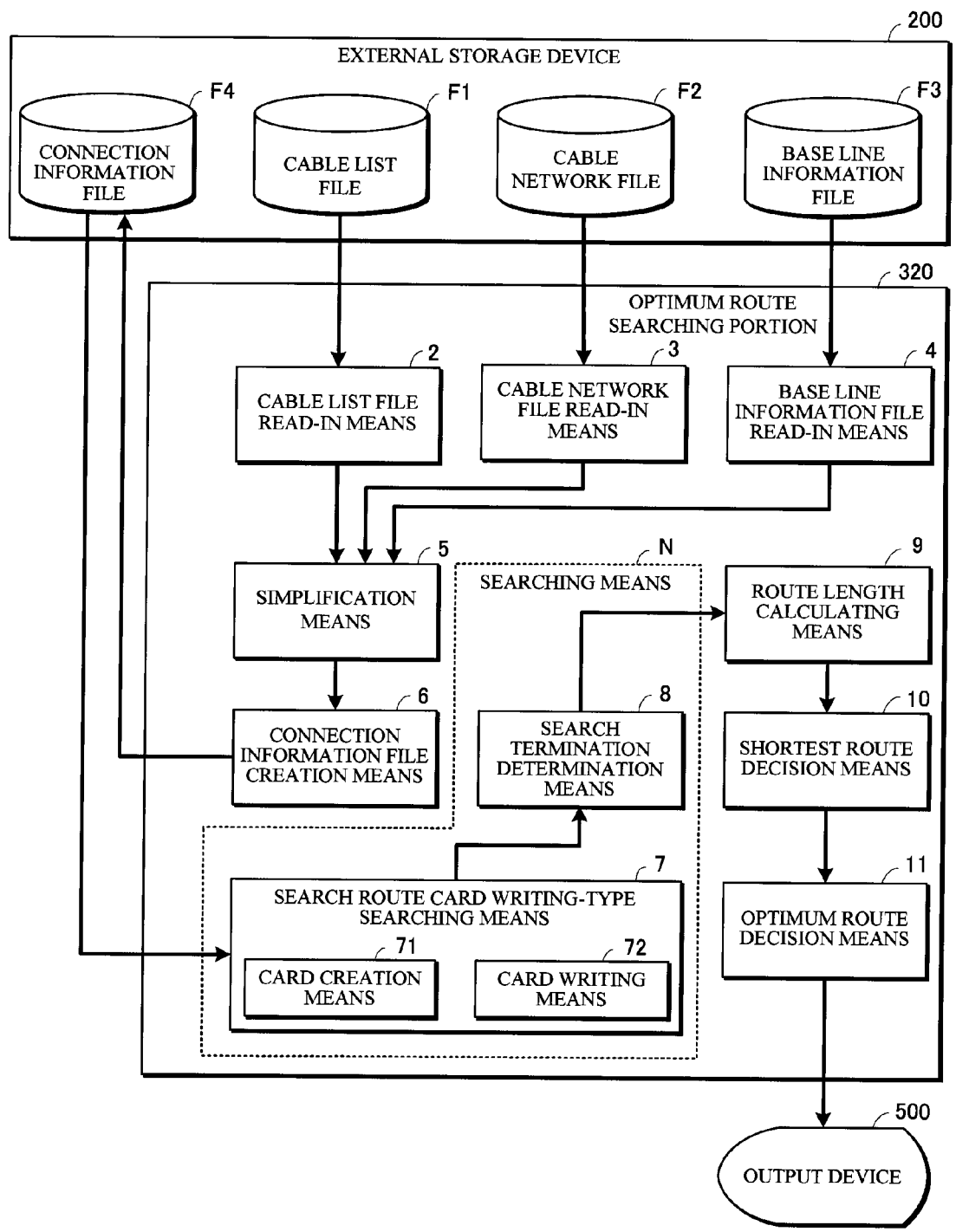
FIG. 2 is a block diagram showing a first embodiment of the optimum route searching apparatus of the present invention.

The configuration of a first embodiment premised on the above overview will be explained by referring to the block diagram of FIG. 2. That is, the optimum route searching portion 320 of the first embodiment has cable list file read-in means 2, cable network file read-in means 3, base line information file read-in means 4, simplification means 5, connection information file creation means 6, searching means N, route length calculating means 9, shortest route decision means 10, and optimum route decision means 11.

Cable list file read-in means 2, cable network file read-in means 3 and base line information read-in means 4 are means for reading in the cable list file F1, cable network file F2 and base line information file F3.

Simplification means 5 is for simplifying the files read in to cable list file read-in means 2, cable network file read-in means 3 and base line information read-in means 4. This simplification is a preparatory task for reducing the processing load by making determinations based on 3D-CAD attributes included in the cable list file F1, cable network file F2 and base line information file F3, and omitting information related to unnecessary connection points.

For example, in the above-mentioned files F1 through F3, the connection points of cable trays and other such parts are regarded as nodes, and a virtual line connecting these nodes is regarded as a search route. Thus, because nodes correspond to connection points, the number of these connection points is huge. However, a cable tray may be represented using only branching points, bending points, terminal points (start or end point) or points in proximity thereto. Accordingly, simplification means 5 can reduce the amount of data used in a search and lessen the processing time of a route search by extracting information related to the nodes at these points.

Furthermore, as mentioned above, the information extracted at the time of simplification may include nodes corresponding to a branching point, bending point, and terminal point, as well as nodes related thereto, like points in proximity to these points. The criteria for determining whether or not a node is a proximity point may be the same evaluation criteria as that for the nearest node, which will be explained further below, but the present invention is not limited to this criteria. Furthermore, in such situations, it is supposed that the proximity point evaluation criteria has been inputted beforehand by the user using the input device 100, and has been set in either the external storage device 200 or the internal storage device 400.

Connection information file creation means 6 is for putting together a connection information file based on the results of the required information having been extracted and simplified by simplification means 5. The connection information file, for example, constitutes information from which all nodes other than the branching point, bending point and start or end point have been deleted, as shown in the change in the mode from FIG. 18A to FIG. 18B.

Searching means N has search route card writing-type searching means 7 and search termination determination means 8. Search route card writing-type searching means 7 has card creation means 71 and card writing means 72. Card creation means 71 is for creating cards for the number of branching points among the nodes on a route based on the connection information file. Card writing means 72 is for writing a route in which nodes are connected from the start point to either the end point or the dead end on the created cards.

Search termination determination means 8 is for determining, in accordance with a predetermined condition, whether or not to terminate a route search by search route card writing-type searching means 7. A route, which has been described from start point to end point on the cards, becomes a cable laying route candidate at the time the route search is terminated.

The predetermined condition can conceivably be the fact that all the cards of a search have been completed, or the fact that the number of cable laying route candidates has reached a preset number, but the present invention is not limited to these conditions. Furthermore, it is supposed that this condition has been inputted beforehand by the user using the input device 100, and has been set in either the external storage device 200 or the internal storage device 400 (termination condition storage device).

Route length calculating means 9 is for determining via calculations the length (route length) of a cable laying route candidate based on the connection information file when there is a termination determination from search termination determination means 8. Shortest route decision means 10 is for extracting the shortest route (finding the cards on which the shortest route is written) based on the route length determined by route length calculating means 9. Optimum route decision means 11 is for deciding the optimum route from among the routes extracted by shortest route decision means 10 in accordance with a predetermined condition, and writing this optimum route in a predetermined format that has been determined for output use.

Examples of the predetermined condition can conceivably be the act of sequentially passing through specified via points, or the fact that the space factor is not a problem, but the present invention is not limited to these conditions. A specific mode for searching for a route that sequentially passes through specified via points will be explained further below in connection with a third embodiment. A specific mode for searching for a route that is not a problem from the aspect of the space factor will be explained further below in connection with a fourth embodiment.

Furthermore, a determined optimum route is outputted to the output device 500 in a predetermined format, and notified to the user.

(1-2. Operation)

Figure 53:
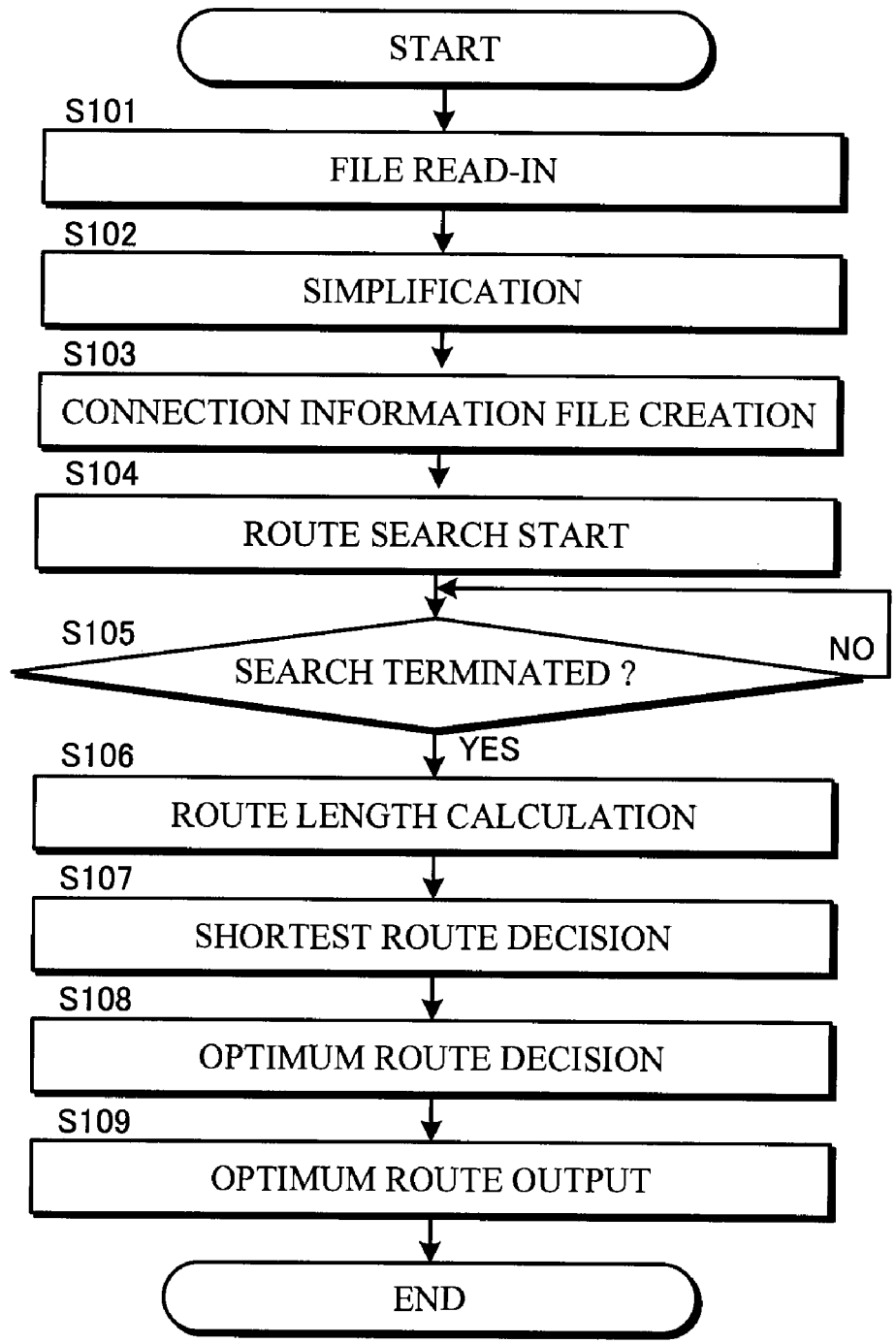
FIG. 53 is a flowchart showing the processing steps of the first embodiment.

The operation of the above-described first embodiment will be explained in accordance with the flowchart of FIG. 53, and by referring to FIGS. 1 and 2, and FIGS. 16 through 25.

(1-2-1. File Read-in (Step 101))

First, cable list file read-in means 2, in response to a user instruction inputted from the input device 100, writes in the name of the installation area (hereinafter, referred to as the area name) or name of the equipment (or control panel) (hereinafter refereed to as the equipment name) that constitutes the start point of the search, and the area name/equipment name that constitutes the end point. Furthermore, hereinafter, the area name and equipment name will comprise a broad range of information for the identification thereof. Therefore, an area name or equipment name may be any of a name, code, abbreviation, number, symbol or the like.

In the example of the cable list file F1 of FIG. 15, a unique cable number has been assigned to a specific cable, and for each cable number there is associatively recorded a start point (From) equipment number, equipment name and area name, and an end point (To) equipment number, equipment name and area name. An area name may also be used when the cable number is uncertain.

Next, cable network file read-in means 3 reads in node connection information from the cable network file F2. The example of a cable network file F2 of FIG. 16 comprises Linkage sheet information and a Node sheet on which the coordinates of the respective nodes are recorded. In the Linkage sheet, for example, nodes are recorded as "N1, N2, N3, N4, N5 . . . ", and the links among these nodes are shown in image form. The coordinates of all nodes, the type of node (branching point (Branch)/bending point (Corner)/terminal point (start or end point)/other), via point information, and cross-section size are recorded in the Node sheet.

Next, base line information file read-in means 4 reads in the coordinates of the areas recorded in the base line information file F3. In the example of a base line information file F3 of FIG. 17, a base line name, direction, offset value from point of origin, and area name are recorded, and a minimum value and maximum value are respectively stored in the XYZ direction of an area. This makes it possible to express the three-dimensional scope of an area based on the base line information file F3. Furthermore, expanding the method of expressing this three-dimensional scope makes it possible to use this three-dimensional scope as the scope of the maximum external dimensions of the equipment and panels.

(1-2-2. Simplification (Step 102))

Simplification means 5 extracts from the Linkage sheet and Node sheet in the cable network file F2 only that information required for a route search, thereby reducing the contents to be searched. This method, for example, reduces the nodes that exist on a continuous straight line from a corner to a corner, from a corner to a branching point, and from a branching point to a branching point. In the example shown in FIG. 18A, the nodes (N2, N3, N8, N9, N10, N11, N12) included in the Linkage sheet are nodes that exist on a straight line.

For this reason, as shown in FIG. 18B, simplification means 5 deletes such nodes. In accordance with this, simplification means 5 also updates the Node sheet as shown in FIG. 19.

(1-2-3. Connection Information File Creation (Step 103))

Connection information file creation means 6 creates a connection information table based on the Linkage data and Node data updated by simplification means 5. The connection information table is a table in which the number of simplified node connections, name of connected node, and so forth are recorded, and this table is directly used in a search process.

Figure 20:
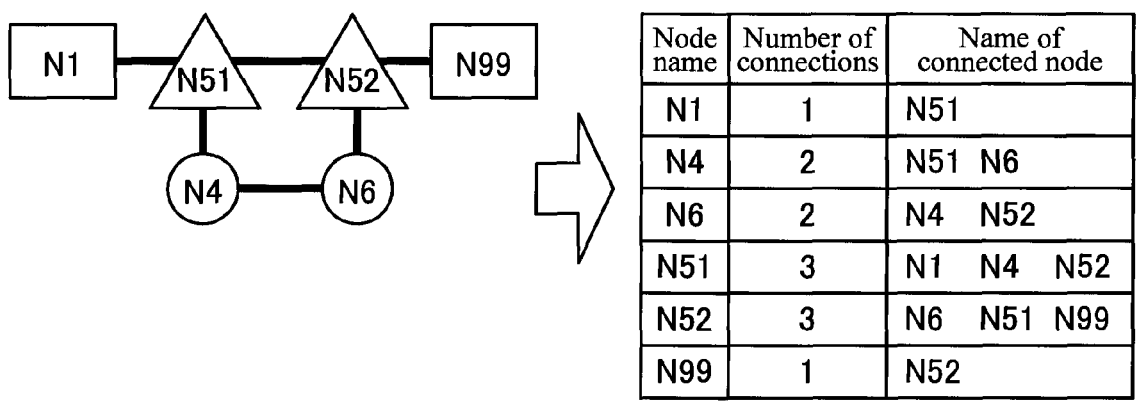
FIG. 20 is a diagram showing an example of a connection information file subsequent to simplification.

On the right side of FIG. 20, there is an example of a connection information table created by connection information file creation means 6 using simplified data.

On the left side of FIG. 20, there is an image of the connections signified by the connection information table. For example, in this FIG. 20, the only connection destination for N1 is N51. Accordingly, in the connection information table, the number of connections is given as 1, and the name of the connected node is N51. That is, when the number of connections is 1, the node is a "terminal point (may be expressed as start point/end point/dead end)".

Next, the number of connections for N51 is 3, and the connected nodes are N1, N4 and N52. When the number of connections is three or more like this, the node constitutes a branching point (Branch). Furthermore, the number of nodes for N4 is 2, and the connected nodes are N51 and N6. When the number of connections is 2 like this, the node may be called an ordinary node with no branching points. The connection information file used in a route search is created as described above.

(1-2-4. Route Search (Step 104))

Card creation means 71 of search route card writing-type searching means 7 creates cards, and card writing means 72 writes a searched route on the cards.

Furthermore, although called cards, these cards are actually an array that is realized in the internal storage device 400, such as the memory of the computer. In the first embodiment, a searched route is expressed as an image written onto one card at a time, and this expression is used to make it easier to understand the processing of the computer.

Figure 21:
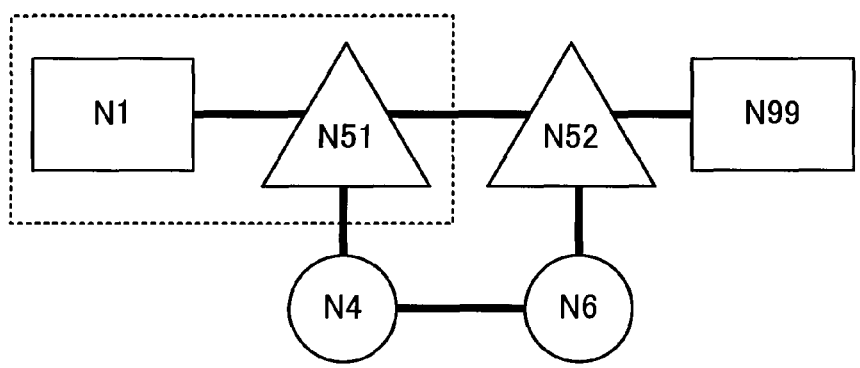
FIG. 21 is a diagram showing a card creating process of search route card writing-type searching means.

For example, as shown in FIG. 21, card creation means 71 creates a card (secures an array region) upon encountering a branching point in the process of searching a route. Card writing means 72 writes the results of the search on a card (array) inside the computer. In the example of FIG. 21, the part enclosed within the dotted line constitutes the first card. Card writing means 72 records <N1, N51> in the first card.

Figure 22:
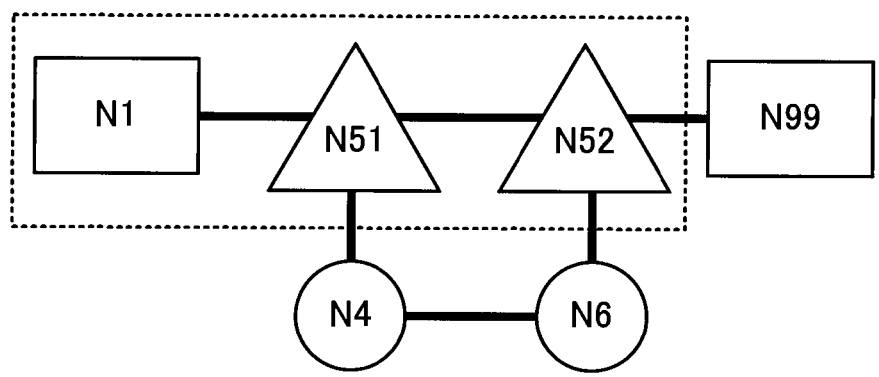
FIG. 22 is a diagram showing a card updating process of search route card writing-type searching means.

Next, card writing means 72 updates the first card upon encountering a second branching point as shown in FIG. 22. Card writing means 72 records <N1, N51, N52> in the first card at this time. Card creation means 71 may create a card each time a branching point is encountered, or card writing means 72 may update the previous card as described hereinabove. Thus, the amount of resources utilized may be reduced by card writing means 72 updating a card.

Figure 23:
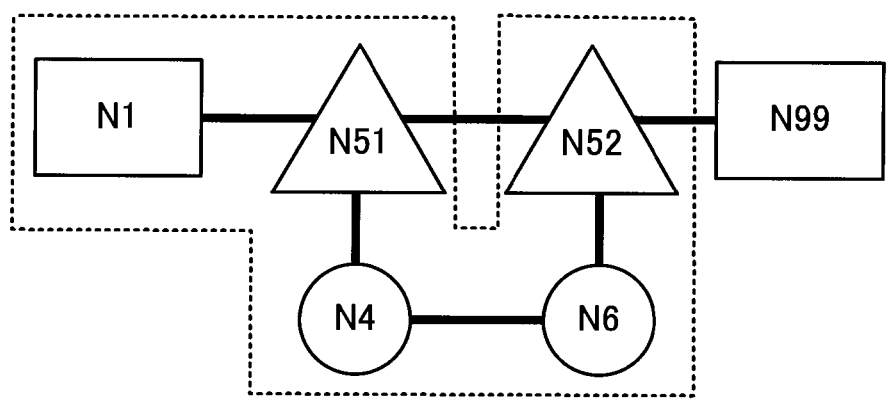
FIG. 23 is a diagram showing a card adding process of search route card writing-type searching means.

Next, as shown in FIG. 23, card creation means 71 tracks from N51 to N4 and N6, and upon encountering a branching point at N52, creates a second card. The portion enclosed within the dotted line in FIG. 23 constitutes the second card. Card writing means 72 records <N1, N51, N4, N6, N52> in the second card.

FIG. 24 shows the flow and results of the card creating and writing described above. After creating the second card, the first card is updated with <N1, N51, N52, N99>. The N99 node here constitutes the end point. Next, a third card is created. <N1, N51, N52, N6, N4> is recorded in the third card. Furthermore, the second card is updated to <N1, N51, N4, N6, N52, N99>. Node N99 is the end point. Thus, as a rule, the number of cards increases each time a branching point is encountered, and the end point is searched out.

Furthermore, since a route does not return to a node that has already been written on a card, the route <N1, N51, N4, N6, N52, N51> is not written to the second card. Similarly, the route <N1, N51, N52, N6, N4, N51> is not written to the third card. Then, the first and second cards, which reached the end point, become the cable laying route candidates. Since the third card does not reach the end point, it constitutes a dead end.

(1-2-5. Search Termination (Step 105))

Search route card writing-type searching means 7 carries out search processing for all the routes in accordance with steps like those described above. Then, search termination determination means 8, on the basis of a termination condition, terminates the searching of search route card writing-type searching means 7 when a determination has been made that the routes of all the cards have reached either the end point or a dead end. In the example given above, three cards were created, and the results of searches that found their way from the start point to the end point were written in for only two of these cards, the first and second cards.

At the above-mentioned time when the search is terminated, the first and second cards, on which were recorded routes from the start point to the end point, become the cable laying route candidates as shown in FIG. 25. Then, the route explained below is selected from among these cable laying route candidates as the optimum route.

(1-2-6. Route Length Calculation (Step 106))

As described hereinabove, route length calculating means 9 calculates the length (route length) from the start point to the end point for the cable laying route candidates found by search route card writing-type searching means 7. The calculation of this route length may be carried out based on the coordinate values of the respective nodes.

(1-2-7. Shortest Route Decision (Step 107))

Shortest route decision means 10 determines the route, from among the cable laying route candidates, for which the route length determined by route length calculating means 9 is the shortest, and extracts this route.

(1-2-8. Optimum Route Decision (Step 108))

Furthermore, optimum route decision means 11 determines the route that meets a predetermined condition, such as sequentially passing through a specified via point, or not posing a problem in terms of the space factor, and determines this route to be the optimum route.

(1-2-9. Optimum Route Output (Step 109))

For the optimum route, which has been determined as described hereinabove, the route from the start point to the end point and the route length thereof is outputted by the output device 500, and the user is notified.

(1-3. Effect)

According to the above-described first embodiment, using a search method in which a card is either created or updated each time a branching point is encountered results in all routes being searched. Consequently, the optimum cable laying route can be determined with accuracy and a high degree of precision, making it possible to lay a cable along the optimum route.

Further, since the cable list file F1, cable network file F2 and base line information file F3, which are the initial data, are simplified, and searching is conducted using only data required for the search, an optimum cable laying route can be obtained in a short period of time. Consequently, design time can be shortened, and the amount of work and costs involved in design and development can be reduced. Furthermore, even if a change is made to a cable tray or the like in the design and development stage, this change can be dealt with quickly.

The search method according to this first embodiment clearly differs from those of Japanese Patent Application Laid-open No. 9-50454, Japanese Patent Application Laid-open No. 9-160961 and Japanese Patent Application Laid-open No. 9-167173, and also differs from the search method disclosed in Japanese Patent Application Laid-open No. 2007-052495 in the following point. That is, in Japanese Patent Application Laid-open No. 2007-052495, searching is carried out by targeting all the terminal points (connection points) of the cable tray components. By contrast, in this embodiment, the search data is simplified prior to carrying out a search. By simplifying the search data like this, this embodiment makes it possible to shorten processing time.

Further, adopting the shortest route from among the cable laying route candidates makes it possible to curb excess cable expenses. Also, since an estimated value of the amount of cable to be used may be determined arbitrarily, an expected value for development costs may be determined, thereby providing information that can be put to effective use from the estimate stage through the design, logistics and implementation stages. Furthermore, after the building or plant has been completed, this information may also be put to good use in reviewing differences in the amount of cable called for by the designs and that amount actually used in the cable laying process. Moreover, when actual costs differ from the planned costs, this information may also be used after the building or plant has been completed to determine what caused the cost difference to occur.

Furthermore, a more suitable cable laying route may be achieved in a case in which a shortest route, which has cleared via point and space factor conditions, is regarded as the optimum cable laying route. When various conditions, inclusive of the shortest route, are set, the user may be informed of the reasons for having selected the cable laying route that was ultimately determined.

(2. Second Embodiment)

(2-1. Configuration)

Figure 3:
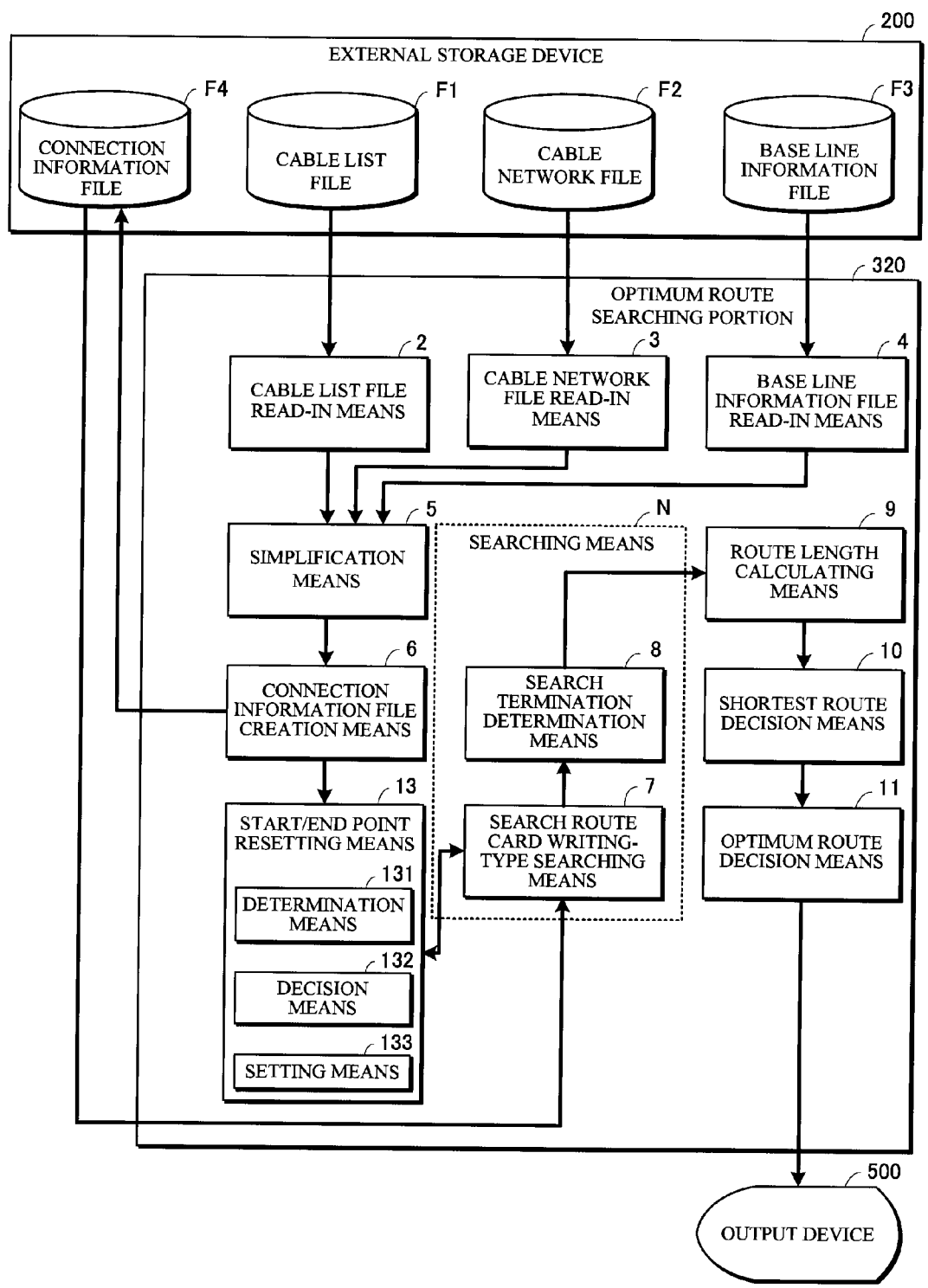
FIG. 3 is a block diagram showing a second embodiment of the optimum route searching apparatus of the present invention.

Next, a second embodiment of the present invention will be explained by referring to the block diagram of FIG. 3. Furthermore, components, which are the same as those of the first embodiment of FIG. 2, will be assigned the same reference numerals, but explanations of these components will be omitted, and only those components that differ from the first embodiment will be explained.

That is, the second embodiment differs from the first embodiment in that start/end point resetting means 13 has been added to the optimum route searching portion 320. Start/end point resetting means 13 has determination means 131, decision means 132, and setting means 133. Determination means 131 is for determining, based on the connection information file F4, whether or not a node constituting either the start point or the end point, exists either in the area where a search will start or in the area where a search will end in a route search by search route card writing-type searching means 7.

It is supposed that either the area where the search will start or the area where the search will end has been inputted as the desired area beforehand by the user using the input device 100, and that this area has been set in either the external storage device 200 or the internal storage device 400.

When determination means 131 has determined that a node that will become either the start point or the end point does not exist in either the start point area or the end point area, decision means 132 is for deciding the nearest node outside of this area. Setting means 133 is for setting the nearest node decided by decision means 132 as either the start point or end point of the search by search route card writing-type searching means 7.

The criteria for deciding the nearest node can conceivably be a node adjacent to the search direction, and when there is a plurality of adjacent nodes, the node that is closest in terms of distance. However, the present invention is not limited to these criteria. Furthermore, it is supposed that these criteria have been inputted beforehand by the user using the input device 100, and have been set in either the external storage device 200 or the internal storage device 400 (decision criteria storage means).

(2-2. Operation)

The operation of the second embodiment having the above-described configuration will be explained. Furthermore, explanations of parts of the operation that are the same as those of the first embodiment above will be omitted, and only those parts that differ from the first embodiment will be explained.

That is, when determination means 131 of start/end point resetting means 13 has determined that a node that will become the start point cannot be found in the start point area set beforehand, decision means 132 decides the nearest node outside this area based on the decision criteria. Then, setting means 133 sets the node decided by decision means 132 as the start point node.

Search route card writing-type searching means 7 carries out the same route search as that of the first embodiment above based on the start point node that has been reset like this. Then, when determination means 131 determines that a node that will become the end point node cannot be found in the area that should become the end point of the route to be obtained by the search, decision means 132 decides the nearest node outside of this area based on the decision criteria. Then, setting means 133 sets the node decided by decision means 132 as the end point node. Search route card writing-type searching means 7 uses the reset end point node as the end point of the searched cable laying route candidates.

(2-3. Effect)

According to the above-described second embodiment, even when a start point node or an end point node is not found using the relationship of the coordinates of either the start point area or the end point area, an optimum route search may still be carried out by using the nearest node. Consequently, it is possible to prevent a situation in which the user is unable to obtain search results.

(3. Third Embodiment)
(3-1. Configuration)

Figure 4:
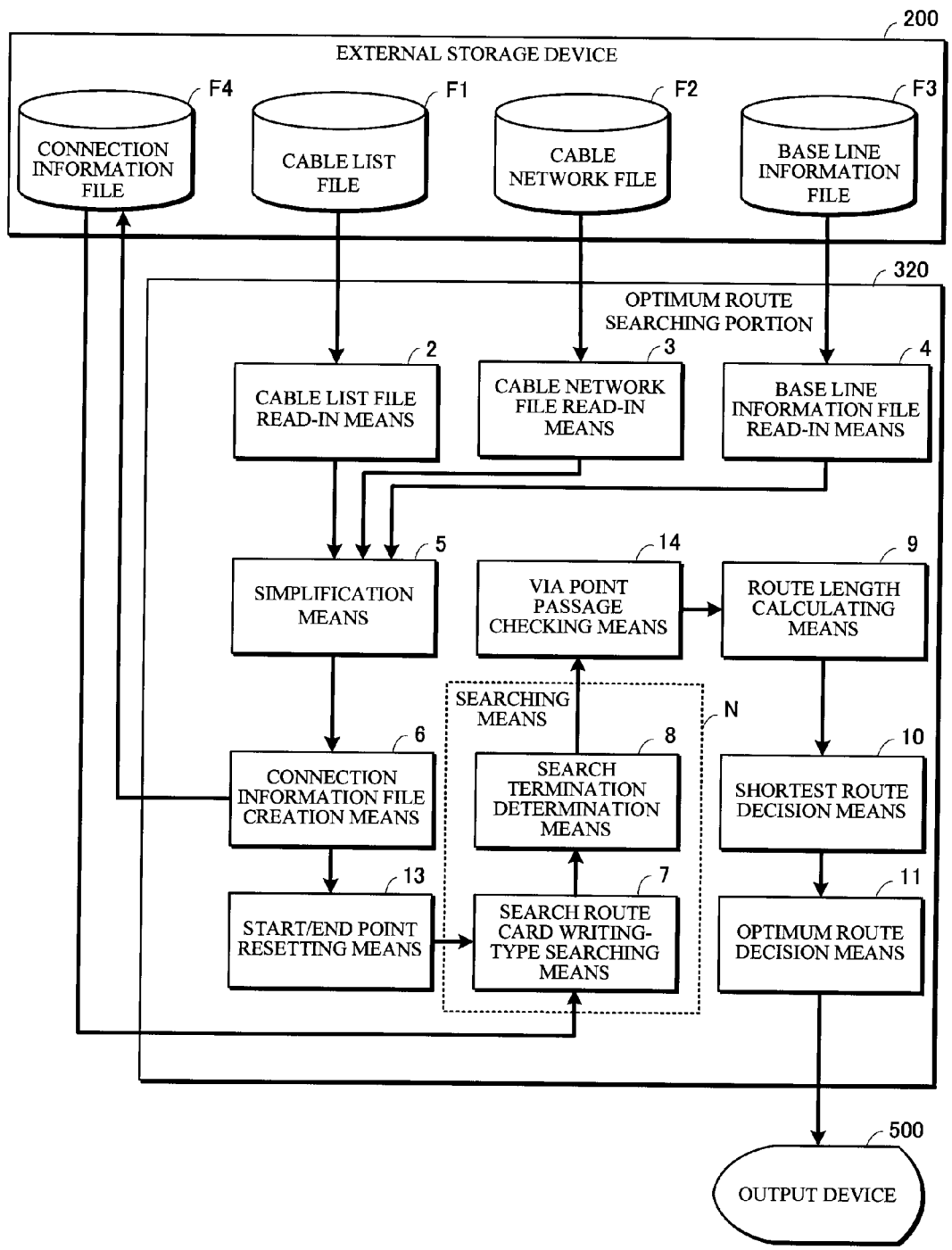
FIG. 4 is a block diagram showing a third embodiment of the optimum route searching apparatus of the present invention.

Next, a third embodiment of the present invention will be explained by referring to the block diagram of FIG. 4. Furthermore, components, which are the same as those of the second embodiment of FIG. 3, will be assigned the same reference numerals, but explanations of these components will be omitted, and only those components that differ from the second embodiment will be explained.

That is, the third embodiment differs from the second embodiment in that via point passage checking means 14 is added to the optimum route searching portion 320. Via point passage checking means 14 is for checking whether or not the cable passes through the points (nodes) it should go through in the order in which it should pass through them for a cable laying route candidate searched by searching means N.

With regard to the nodes that the cable is to pass through and the order in which it is to pass through them, it is supposed that the user will use the input device 100 to input beforehand the desired via points and transit order thereof, and that this information will be set in either the external storage device 200 or the internal storage device 400 (via point storage means).

(3-2. Operation)

The operation of the third embodiment having the above-described configuration will be explained. Furthermore, explanations of parts of the operation that are the same as those of the second embodiment will be omitted, and only those parts that differ from the second embodiment will be explained.

That is, subsequent to a search termination determination by search termination determination means 8, via point passage checking means 14 checks to make sure that the searched cable laying route candidate matches the via points and transit order thereof that were set beforehand. Then, route length calculating means 9 uses the cable laying route candidates that have been confirmed to coincide with these via points and transit order by via point passage checking means 14 as the target for route length calculations.

(3-3. Effect)

According to the above-described third embodiment, the optimum cable laying route can be determined from among route candidates that pass through user-specified via points in the order specified. Thus, it becomes possible to carry out a more precise search tailored to the conditions of individual cable laying sites and the determinations of the user than when the optimum cable laying route is determined simply on the basis of distance alone.

(4. Fourth Embodiment)
(4-1. Configuration)

Figure 5:
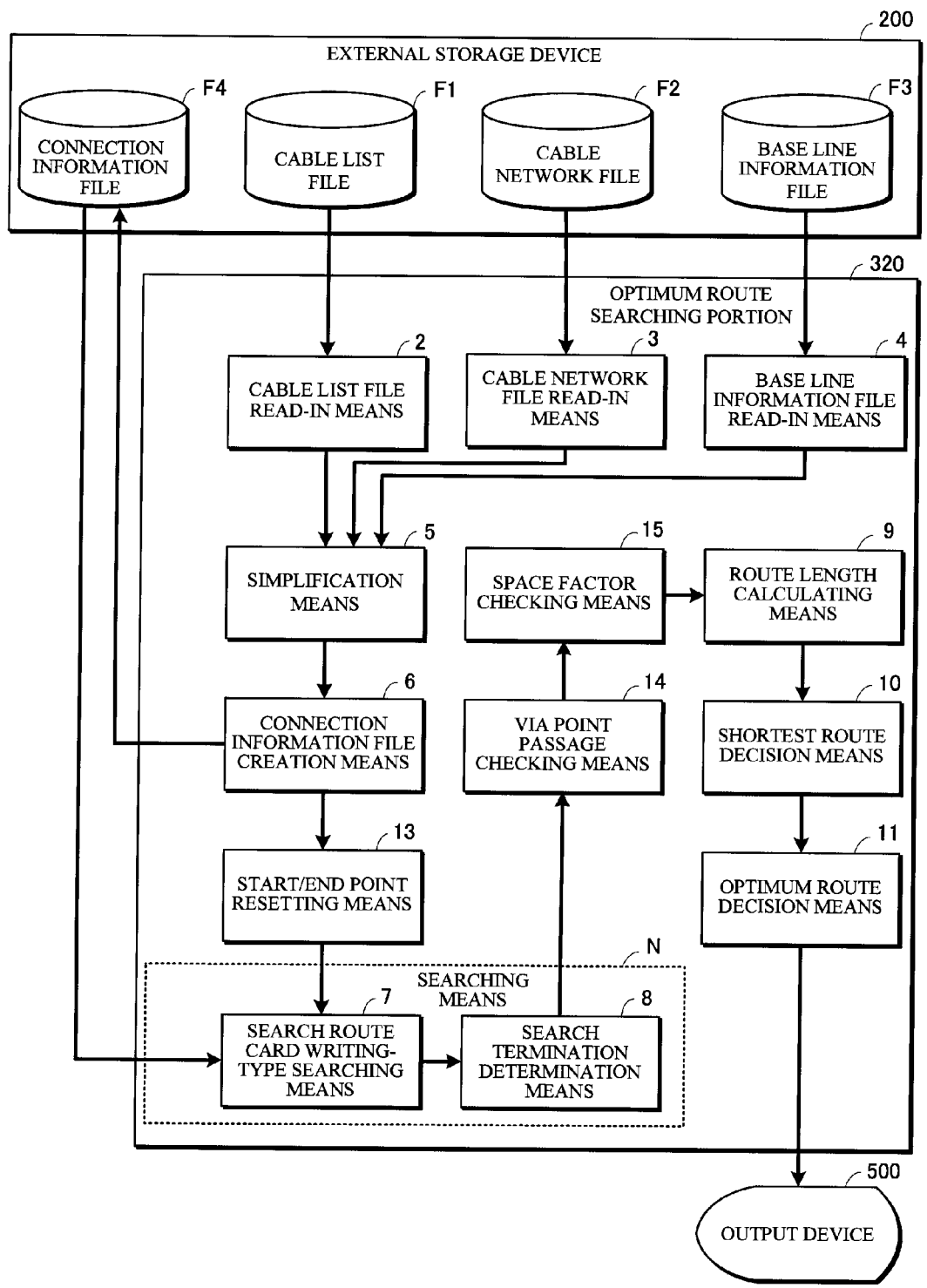
FIG. 5 is a block diagram showing a fourth embodiment of the optimum route searching apparatus of the present invention.

Next, a fourth embodiment of the present invention will be explained by referring to the block diagram of FIG. 5 and the schematic diagram of FIG. 26. Furthermore, components, which are the same as those of the third embodiment of FIG. 4, will be assigned the same reference numerals, but explanations of these components will be omitted, and only the different components will be explained.

That is, the fourth embodiment differs from the third embodiment in that space factor checking means 15 are added to the optimum route searching portion 320. Space factor checking means 15 is for checking whether or not the cable to be laid exceeds the space factor of the cable tray or other such housing member.

Figure 26:
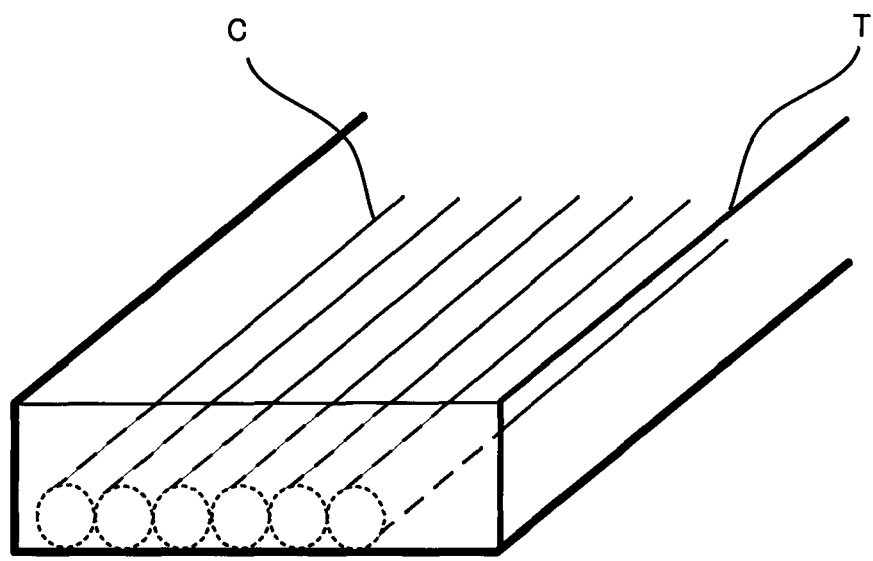
FIG. 26 is a diagram for explaining the space factor.

The space factor is, as shown in FIG. 26, for example, a value which indicates the percentage of a cable tray T on which a cable C can be installed based on the cross-sectional area of this cable tray T as 100%. Because the size of the cable tray T will differ according to the site, the maximum value of the amount of cable C capable of being installed in the cable tray T must be decided. The space factor is utilized for this purpose.

More specifically, if the cross-sectional area of the cable tray T times the space factor is greater than the sum total of the cross-sectional area of the cable C (quantity), cable laying becomes possible. For example, when the cross-sectional area of the cable tray is 100 m² and the space factor is 30%, the total cross-sectional area of the cable C can be no greater than 30 m². Furthermore, if the cross-sectional area of the cable C to be laid is fixed, the number of cables C capable of being installed in the cable tray T is also decided on the basis of the cable tray T space factor.

It is supposed that the user will use the input device 100 to input beforehand this space factor together with the cable tray T identification information for each cable tray T, and that this information will be set in either the external storage device 200 or the internal storage device 400 (housing member information storage means).

Further, it is supposed that the user will use the input device 100 to also input beforehand information related to the cross-sectional area of the cable C to be laid together with the cable C identification information for each cable C, and that this information will be set in either the external storage device 200 or the internal storage device 400 (cable information storage means).

(4-2. Operation)

The operation of the fourth embodiment having the above-described configuration will be explained. Furthermore, explanations of parts of the operation that are the same as those of the third embodiment will be omitted, and only the different parts will be explained.

That is, space factor checking means 15 checks whether or not a cable laying route candidate that has been checked by via point passage checking means 14 will exceed the pre-set space factor when the cable C is actually laid in the cable tray T. Then, route length calculating means 9 uses the cable laying route candidate that has been confirmed not to exceed the space factor as the target for route length calculations.

(4-3. Effect)

According to the above-described fourth embodiment, it is possible to determine the optimum cable laying route such that the cable does not exceed the space factor of the user-specified cable tray. Thus, it becomes possible to carry out a high precision cable laying route search tailored to the conditions of the individual cable trays. In other words, since a reasonable cable laying route is obtained for the respective cable trays, a situation in which it is impossible to lay the cable on the basis of the search results can be prevented.

(5. Fifth Embodiment)

(5-1. Configuration)

Figure 6:
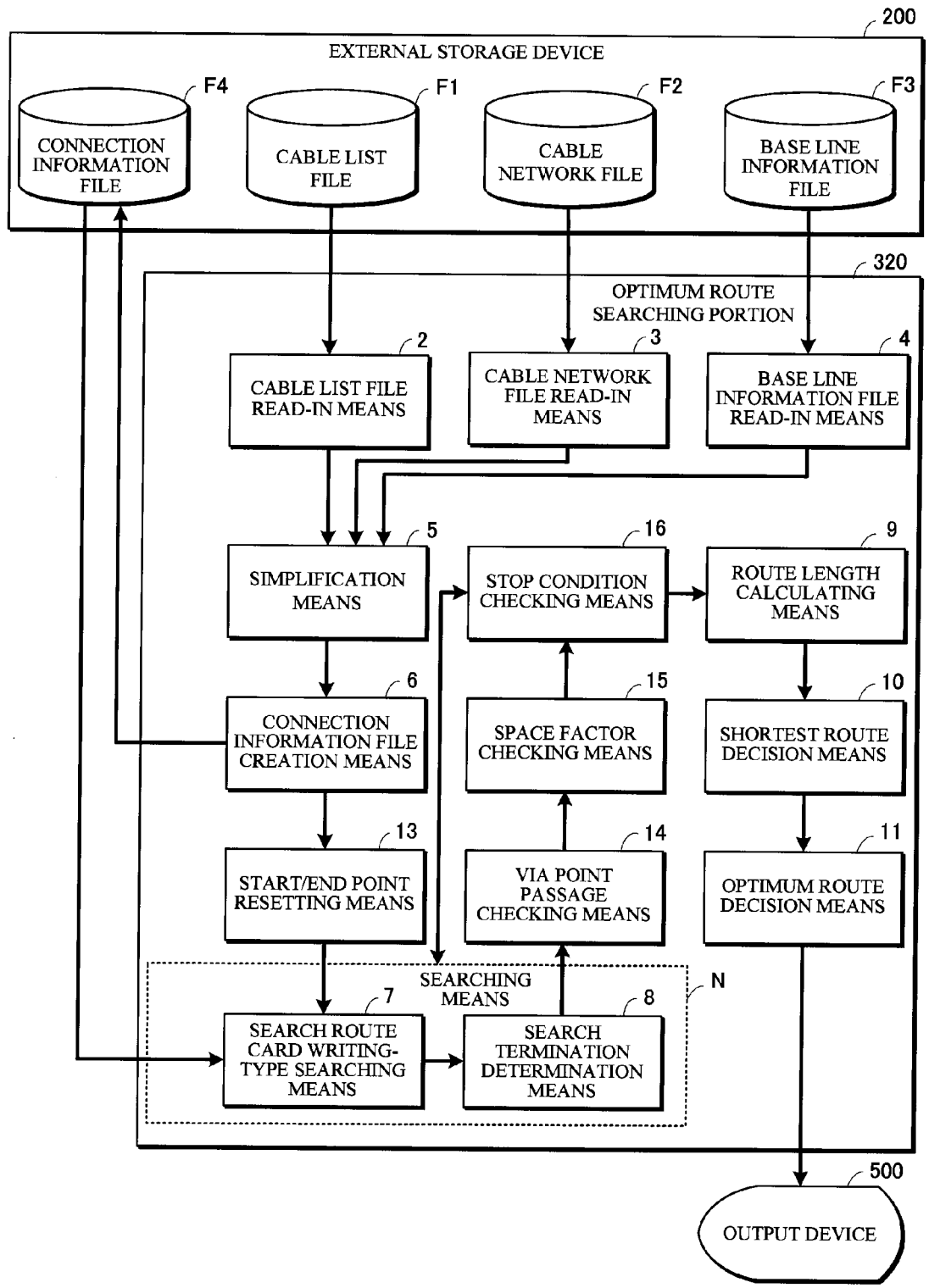
FIG. 6 is a block diagram showing a fifth embodiment of the optimum route searching apparatus of the present invention.

Next, a fifth embodiment of the present invention will be explained by referring to the block diagram of FIG. 6. Furthermore, components, which are the same as those of the fourth embodiment of FIG. 5, will be assigned the same reference numerals, but explanations of these components will be omitted, and only the different components will be explained.

That is, the fifth embodiment differs from the fourth embodiment in that stop condition checking means 16 is added to the optimum route searching portion 320.

Stop condition checking means 16 is for checking whether or not a search should be stopped to lessen the processing load.

The condition under which a search should be stopped can conceivably include the number of cable laying route candidates, the amount of computer memory being used, and the CPU utilization ratio, but the present invention is not limited to these conditions. It is supposed that the user will use the input device 100 to input the stop condition beforehand, and that this information will be set in either the external storage device 200 or the internal storage device 400 (stop condition storage means).

(5-2. Operation)

The operation of the fifth embodiment having the above-described configuration will be explained. Furthermore, explanations of parts of the operation that are the same as those of the fourth embodiment will be omitted, and only the different parts will be explained.

That is, stop condition checking means 16 stops a route search upon confirming that the number of cable laying route candidates subsequent to confirmation by space factor checking means 15 exceeds a pre-set number of candidates, or that the amount of memory being used exceeds a pre-set value, or that the CPU utilization ratio exceeds a pre-set value. Thereafter, processing shifts to route length calculating means 9, which targets cable laying route candidates for which space factor checks have already been completed.

Further, stop condition checking means 16 can also stop a search by searching means N when a check is carried out as described hereinabove during a search by searching means N to see whether or not the search meets the stop condition, and it is determined that the search meets the stop condition.

(5-3. Effect)

According to the above-described fifth embodiment, stopping a route search in accordance with a user-specified optimum number of cable laying route candidates may shorten search time. Further, preventing excessive memory and CPU usage may avoid a computer freeze or other such abnormal situation. Furthermore, excess memory usage and an excess rate of CPU utilization may also be indirectly prevented by setting an optimum number of cable laying route candidates, and may be directly prevented by setting the amount of memory usage and rate of CPU utilization.

Furthermore, prevention of excess memory usage and prevention of an excessive CPU utilization ratio are also possible by stopping a search in accordance with a predetermined condition when the computer is unable to carry out a search of all the routes due for performance reasons. Thus, in this embodiment, it is possible to determine to the utmost extent the optimum cable laying route candidates, and to provide the user with the optimum cable laying route. Furthermore, this point is not taken into consideration at all in Japanese Patent Application Laid-open No. 2007-052495.

(6. Sixth Embodiment)

(6-1. Configuration)

Figure 7:
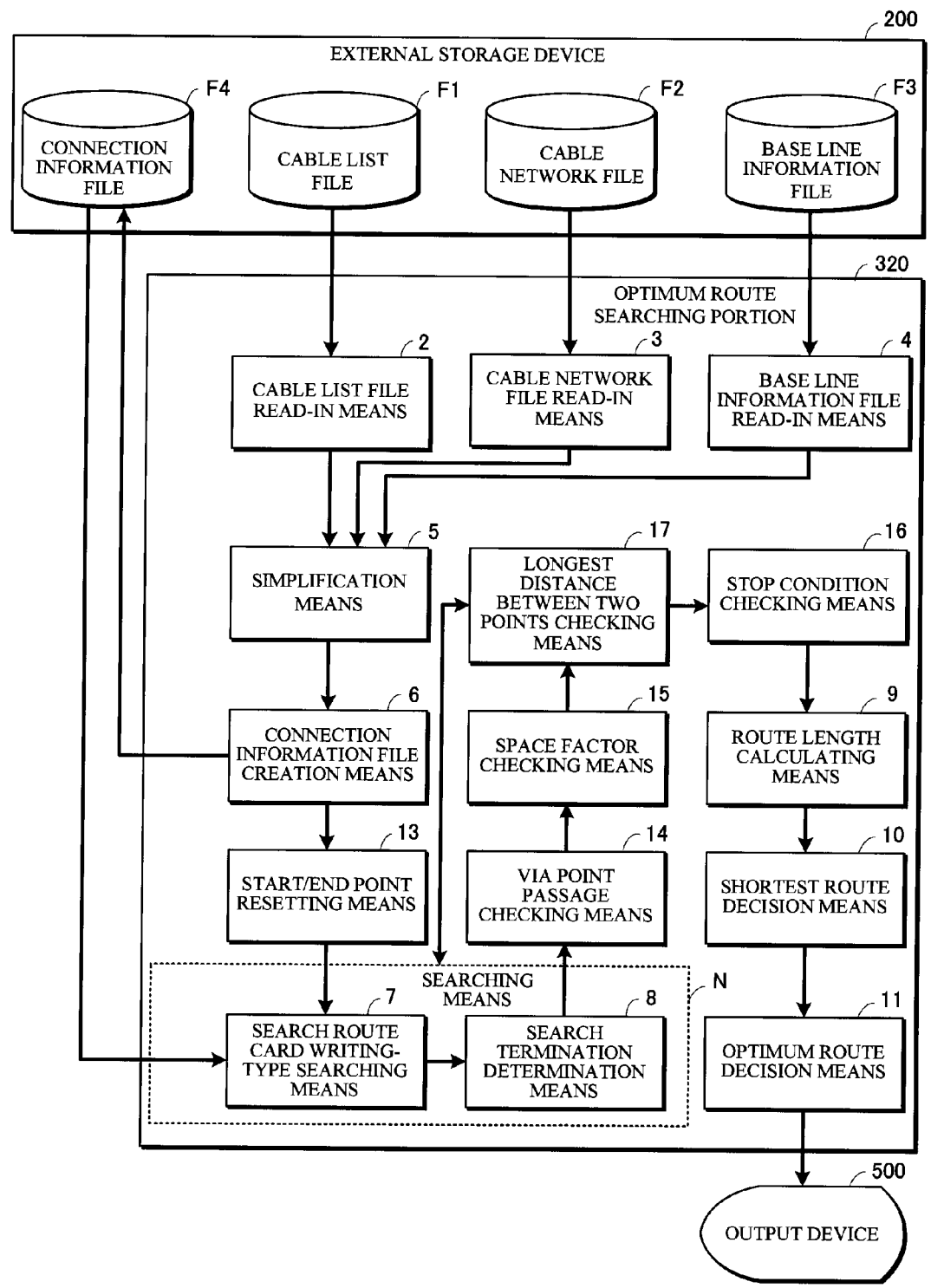
FIG. 7 is a block diagram showing a sixth embodiment of the optimum route searching apparatus of the present invention.

Next, a sixth embodiment of the present invention will be explained by referring to the block diagram of FIG. 7, and the schematic diagrams of FIGS. 27 and 28. Furthermore, components, which are the same as those of the fifth embodiment of FIG. 6, will be assigned the same reference numerals, but explanations of these components will be omitted, and only the different components will be explained.

That is, this embodiment differs from the fifth embodiment in that longest distance between two points checking means 17 is added to the optimum route searching portion 320. Longest distance between two points checking means 17 is for calculating the longest distance between two points from the start point of cable laying route candidates on the basis of the coordinate values of the respective nodes, and checking whether or not this longest distance between two points converges in accordance with a predetermined convergence condition.

Figure 27:
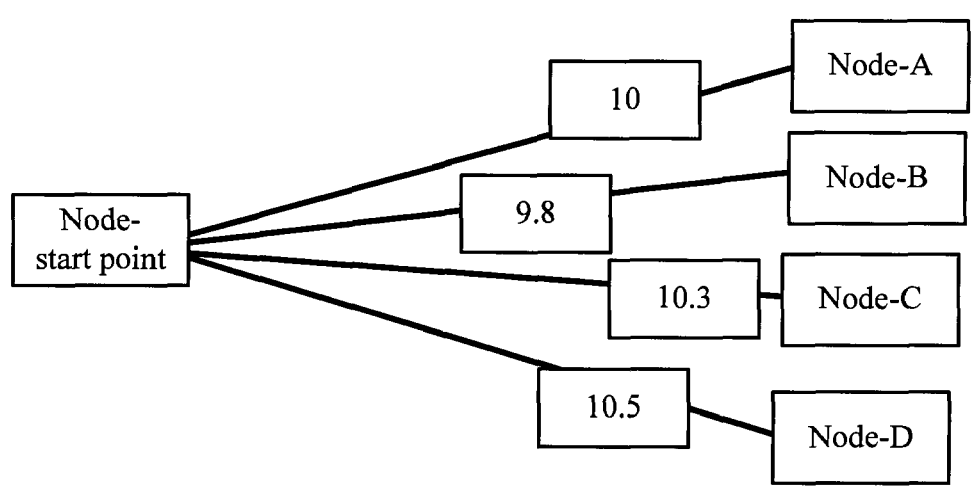
FIG. 27 is a diagram showing an example for determining the longest distance between two points.

As shown in FIG. 27, the predetermined convergence condition can conceivably include the fact that the difference between the longest distance between two points of the respective cable laying route candidates does not exceed 1 at the most, or the fact that the difference between the longest distance between two points of the respective cable laying route candidates and a predetermined criteria value do not exceed 1. It is supposed that the user will use the input device 100 to input this condition beforehand, and that this condition will be set in either the external storage device 200 or the internal storage device 400 (convergence condition storage means).

(6-2. Operation)

The operation of the sixth embodiment having the above-described configuration will be explained. Furthermore, explanations of the parts of the operation that are the same as those of the fifth embodiment will be omitted, and only the part that is different will be explained.

That is, longest distance between two points checking means 17 carries out the following processing. For example, as shown in FIG. 27, longest distance between two points checking means 17 calculates the longest distances between two points from the start points for the respective cable laying route candidates subsequent to these candidates having been checked by space factor checking means 15, and checks whether or not these longest distances between two points converge so as to satisfy the condition set beforehand. Thereafter, processing shifts to the check by stop condition checking means 16, and the calculation process by route length calculating means 9. Thus, after all the cable laying route candidates have been searched, and longest distance between two points checking means 17 has confirmed that the longest distances between two points converge, the cable laying route candidate that is closest to the optimum is selected.

Further, for example, even when longest distance between two points checking means 17 has determined that none of the Nodes A, B, C, D from the start point shown in FIG. 27 is the end point, and the longest distance between two points has stopped changing, the search by searching means N can be terminated. Consequently, even when there is no end point node, it is possible to obtain cable laying route candidates that make the node reached up until then the end point the same as in the second embodiment.

Figure 28:
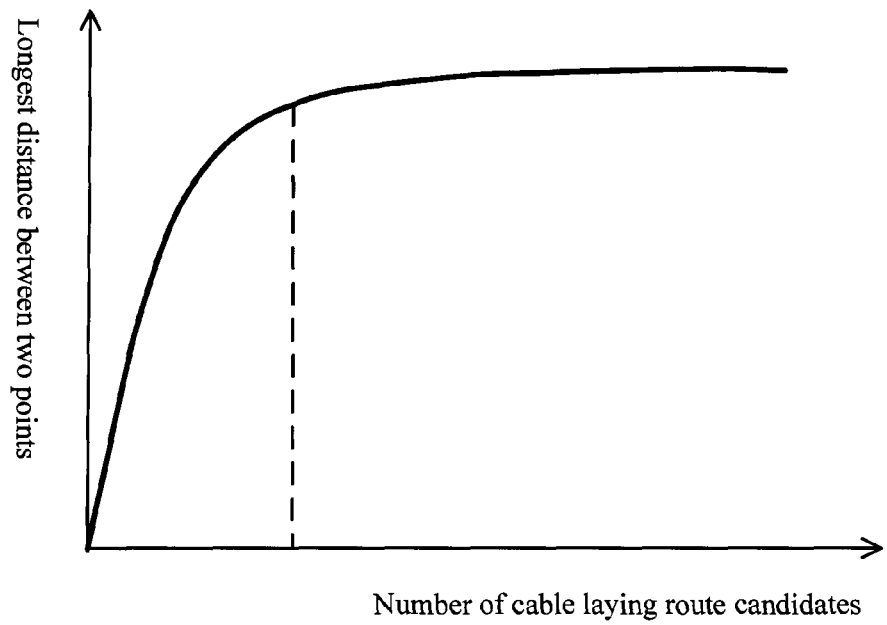
FIG. 28 is a diagram showing the relationship between the longest distance between two points and the number of cable laying route candidates.

Further, for example, as shown in FIG. 28, it is clear that as the search by searching means N progresses and the number of cable laying route candidates increases, at a certain number, the longest distances between two points of the number of respective cable laying route candidates ceases to change (converges). Furthermore, this number will differ according to the scale and the complexity of the cable. Accordingly, when longest distance between two points checking means 17 has confirmed that the longest distances between two points have converged as described hereinabove, it is possible to stop the search by searching means N since a new optimum cable laying route candidate will not be found even if more cable laying route candidates are confirmed.

(6-3. Effect)

According to the above-described sixth embodiment, since it is possible to bring a search to an end point when new optimum cable laying route candidates are no longer being found during the implementation of a route search, search time may be shortened. In other words, when there is little likelihood of obtaining better results even if a search is continued, stopping the search makes it possible to determine the optimum cable laying route from among the cable laying route candidates found up to this point. Therefore, an optimum cable laying route is obtained quickly. Further, shortening processing time makes it possible to reduce the loads on the memory and CPU, thereby also preventing a computer freeze.

(7. Seventh Embodiment)

(7-1. Configuration)

Figure 8:
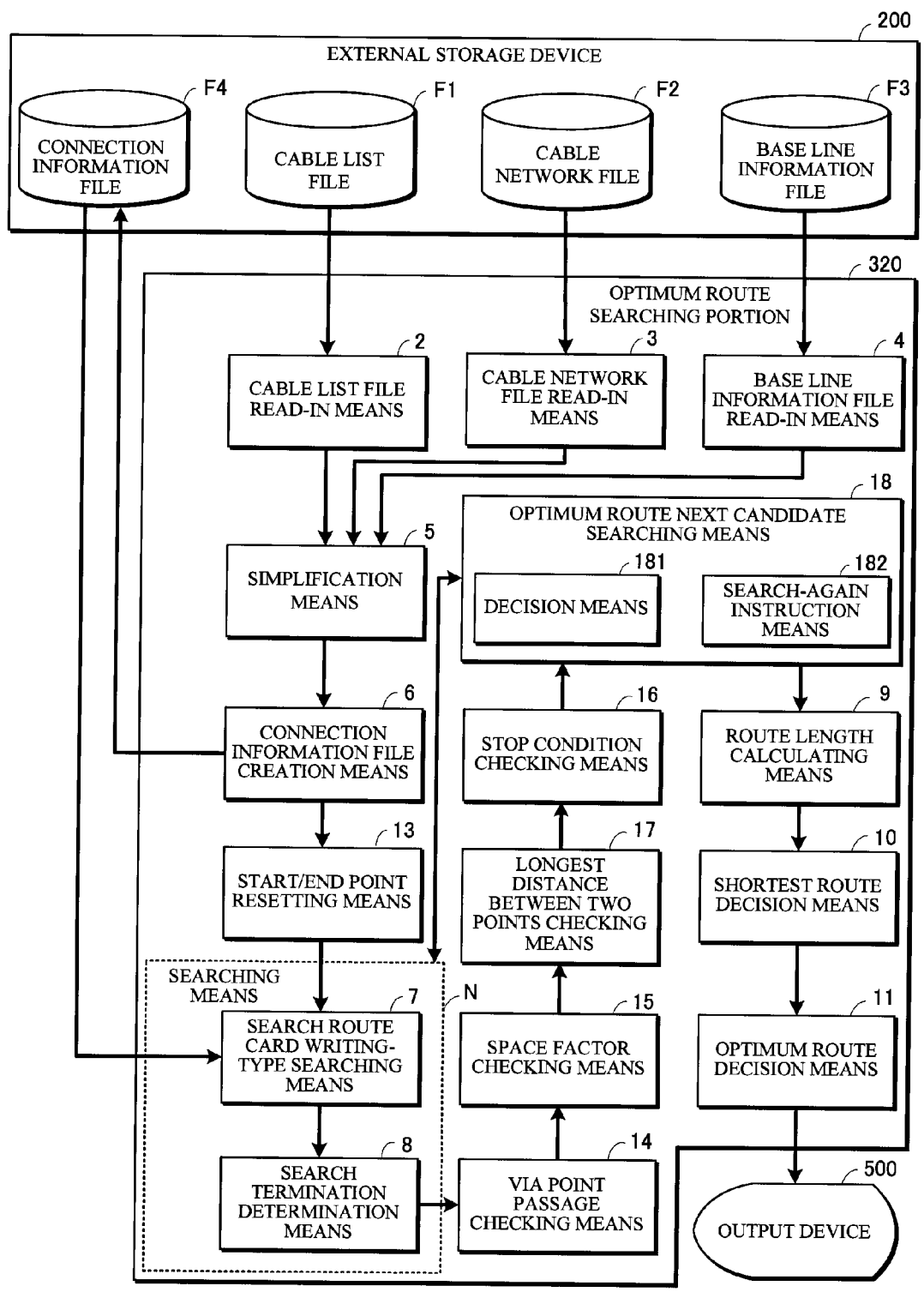
FIG. 8 is a block diagram showing a seventh embodiment of the optimum route searching apparatus of the present invention.

Next, a seventh embodiment of the present invention will be explained by referring to the block diagram of FIG. 8. Furthermore, components, which are the same as those of the sixth embodiment of FIG. 7, will be assigned the same reference numerals, but explanations of these components will be omitted, and only the different components will be explained.

That is, the seventh embodiment differs from the sixth embodiment in that optimum route next candidate searching means 18 is added to the optimum route searching portion 320. Optimum route next candidate searching means 18 has decision means 181, and search-again instruction means 182.

Decision means 181 is for deciding either the node nearest the start point area or the node nearest the end point area when there is no optimum cable laying route candidate even though a search has been carried out from start point to end point. Search-again instruction means 182 is for causing searching means N to carry out a route search again with the node decided by decision means 181 as either the start point or the end point. Furthermore, the method for finding the nearest node is the same as that of start/end point resetting means 13 in the above-described second embodiment.

Furthermore, the criteria for determining that a cable laying route candidate cannot be found can conceivably include the fact there is no end point, the fact that a route does not transit the specified via points, and the fact that the space factor makes installation impossible, but the present invention is not limited to specific criteria. It is supposed that the user will use the input device 100 to input the criteria beforehand, and that the criteria will be set in either the external storage device 200 or the internal storage device 400.

(7-2. Operation and Effect)

According to the above-described seventh embodiment, since it is possible to carry out a route search once again on the basis of the nearest node to either the start point area or the end point area, a route for laying a cable can be reliably determined even when an optimum cable laying route candidate cannot be found. This prevents a situation in which the user is unable to obtain search results.

(8. Eighth Embodiment)

(8-1. Configuration)

Figure 9:
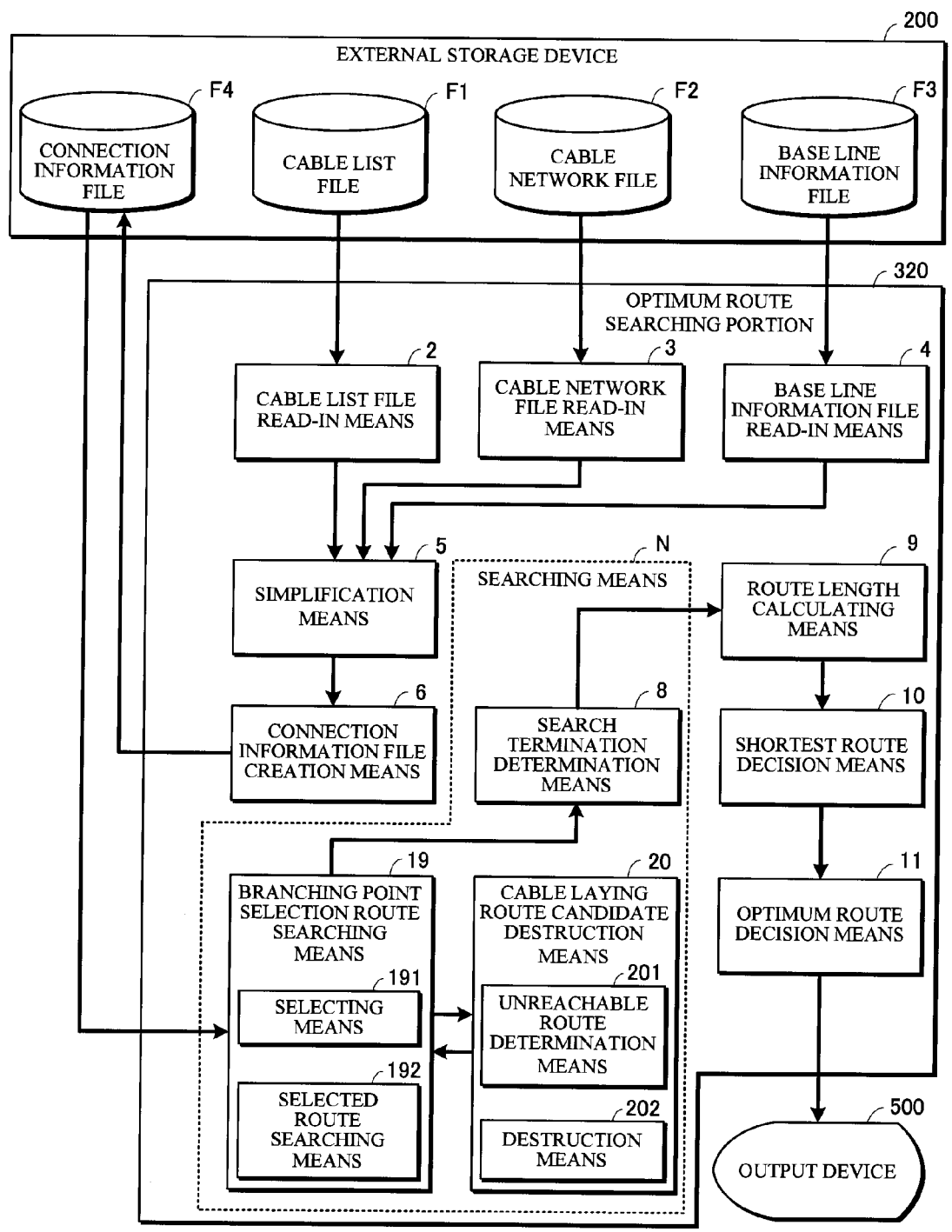
FIG. 9 is a block diagram showing an eighth embodiment of the optimum route searching apparatus of the present invention.
Figure 29:
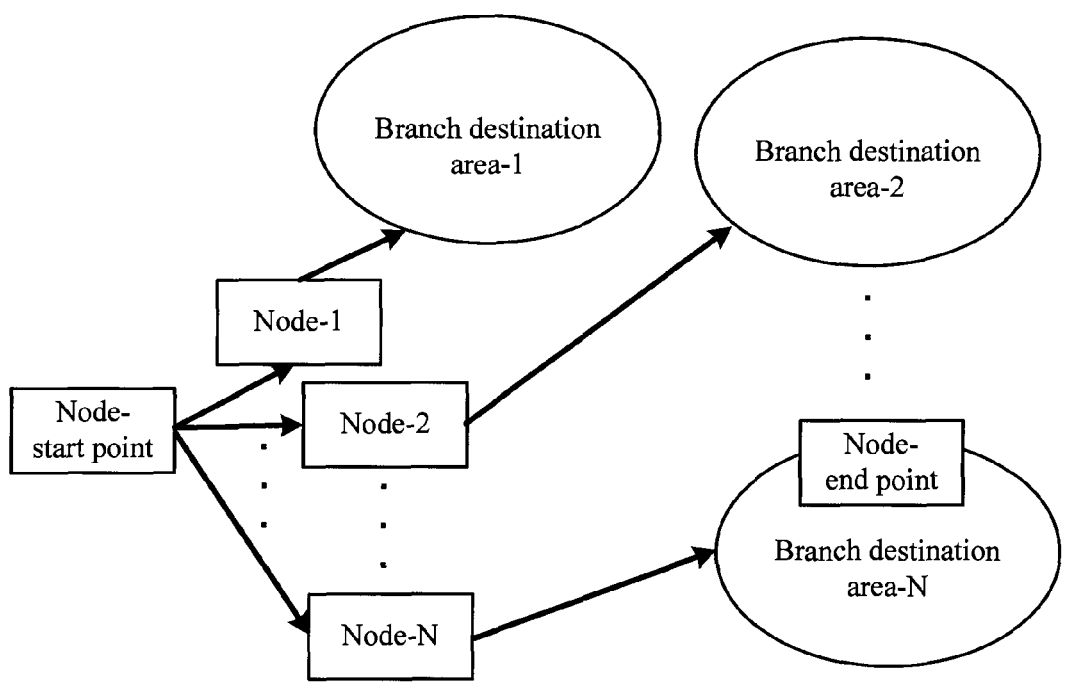
FIG. 29 is a diagram showing searches for each branch destination area.

Next, an eighth embodiment of the present invention will be explained by referring to the block diagram of FIG. 9 and the schematic diagram of FIG. 29. Furthermore, components, which are the same as those of the first embodiment of FIG. 2, will be assigned the same reference numerals, but explanations of these components will be omitted, and only the different components will be explained.

That is, this embodiment differs from the first embodiment in that branching point selection route searching means 19 and cable laying route candidate destruction means 20 are added to the optimum route searching portion 320 instead of search route card writing-type searching means 7. Branching point selection route searching means 19 has selecting means 191 and selected route searching means 192. Selecting means 191 is for selecting a route on which a branching point exists. Selected route searching means 192 is for implementing a route search from the branching point selected by selecting means 191.

Cable laying route candidate destruction means 20 has unreachable route determination means 201 and destruction means 202. Unreachable route determination means 201 is for determining an unreachable route that does not reach from the start point to the end point from among the cable laying route candidates searched by selected route searching means

192. Destruction means 202 is for destructing a cable laying route candidate comprising an unreachable route.

(8-2. Operation)

The operation of the eighth embodiment having the above-described configuration will be explained. Furthermore, explanations of the parts of the operation that are the same as those of the first embodiment will be omitted, and only the part that is different will be explained.

That is, branching point selection route searching means 19 and cable laying route candidate destruction means 20 carry out the following processing. For example, it is supposed that when respective nodes are connected as shown in FIG. 29, branch destination areas each comprising branching points exist beyond "Node-1", "Node-2", . . . , "Node-N" from "Node-start point". Nodes are comprised in each of the respective branch destination areas. However, in this example, it is supposed that end point nodes do not exist in branch destination area-1, branch destination area-2, and so forth, but that branch destination area-N does comprise an end point node.

In the above-described first embodiment, search route card writing-type searching means 7 respectively created cards for branch destination area-1, 2, . . . , N. However, in the eighth embodiment, first of all, selecting means 191 of branching point selection route searching means 19 selects a route comprising a branching point. Then, selected route searching means 192 implements a route search by tracing the nodes in branch destination area-1.

Next, unreachable route determination means 201 of search route candidate destruction means 20 determines there is an unreachable route since an end point node cannot be found in branch destination area-1. Then, destruction means 202 destructs all cable laying route candidates searched in branch destination area-1 determined to have the unreachable route.

Similarly, branching point selection route searching means 19 implements a route search of branch destination area-2 and the others, and cable laying route candidate destruction means 20 destructs the cable laying route candidates for which end point nodes cannot be found.

Furthermore, since an unreachable route determination is not made by unreachable route determination means 201 for branch destination area-N, which has an end point, an annulment is not made by destruction means 202 for branch destination area-N. Consequently, the route comprising branch destination area-N, which was not annulled, becomes the cable laying route candidate.

(8-3. Effect)

According to the above-described eighth embodiment, instead of creating cards for all of the branching points in a route search, routes are selected one at a time based on a branching point, a route search is carried out from this branching point, and a branch destination area route for which an end point cannot be found is annulled. Thus, search time is shortened, and search results are obtained quickly. Further, it is possible to reduce the loads on the memory and CPU, thereby preventing a computer freeze.

(9. Ninth Embodiment)

(9-1. Configuration)

Figure 10:
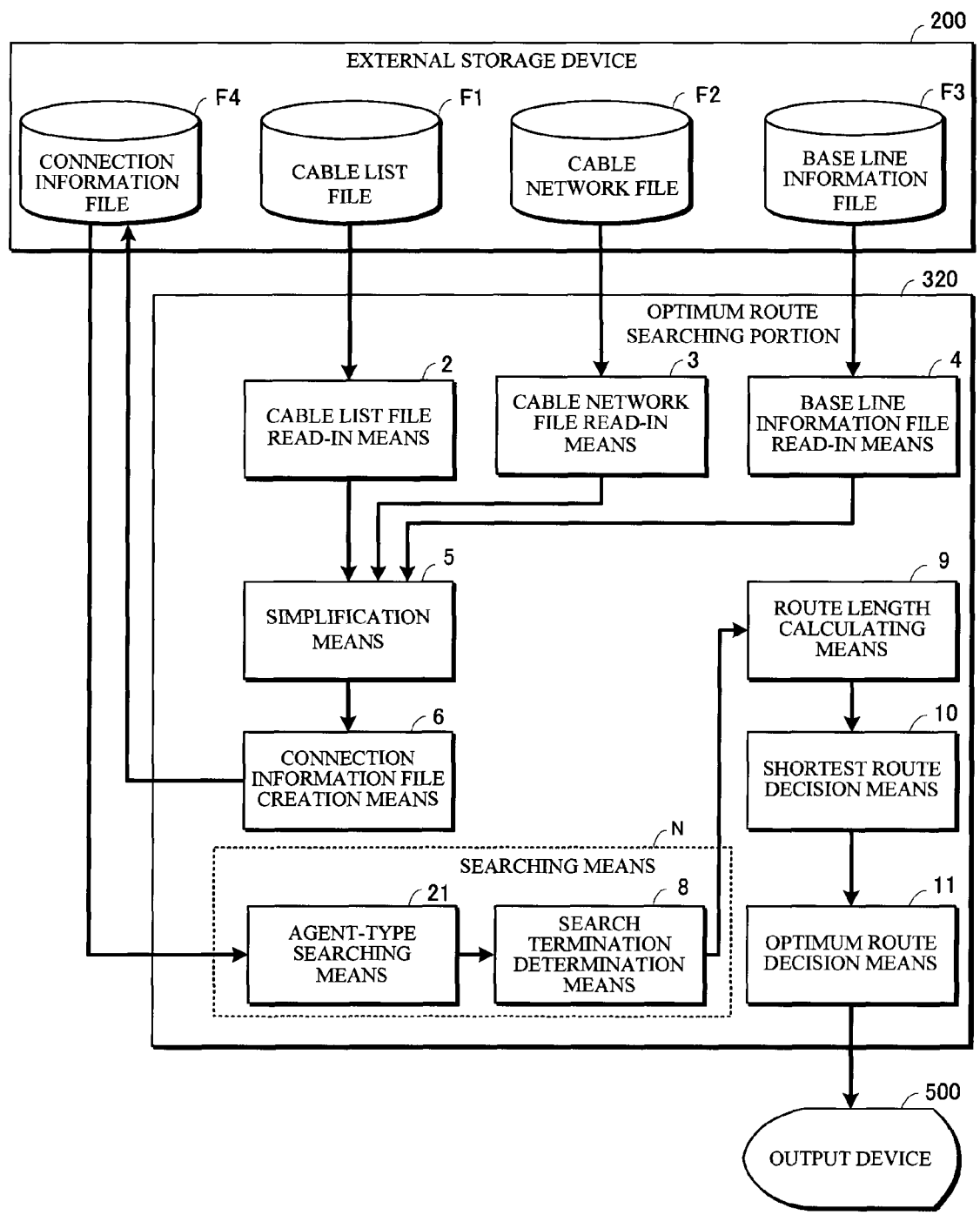
FIG. 10 is a block diagram showing a ninth embodiment of the optimum route searching apparatus of the present invention.
Figure 54:
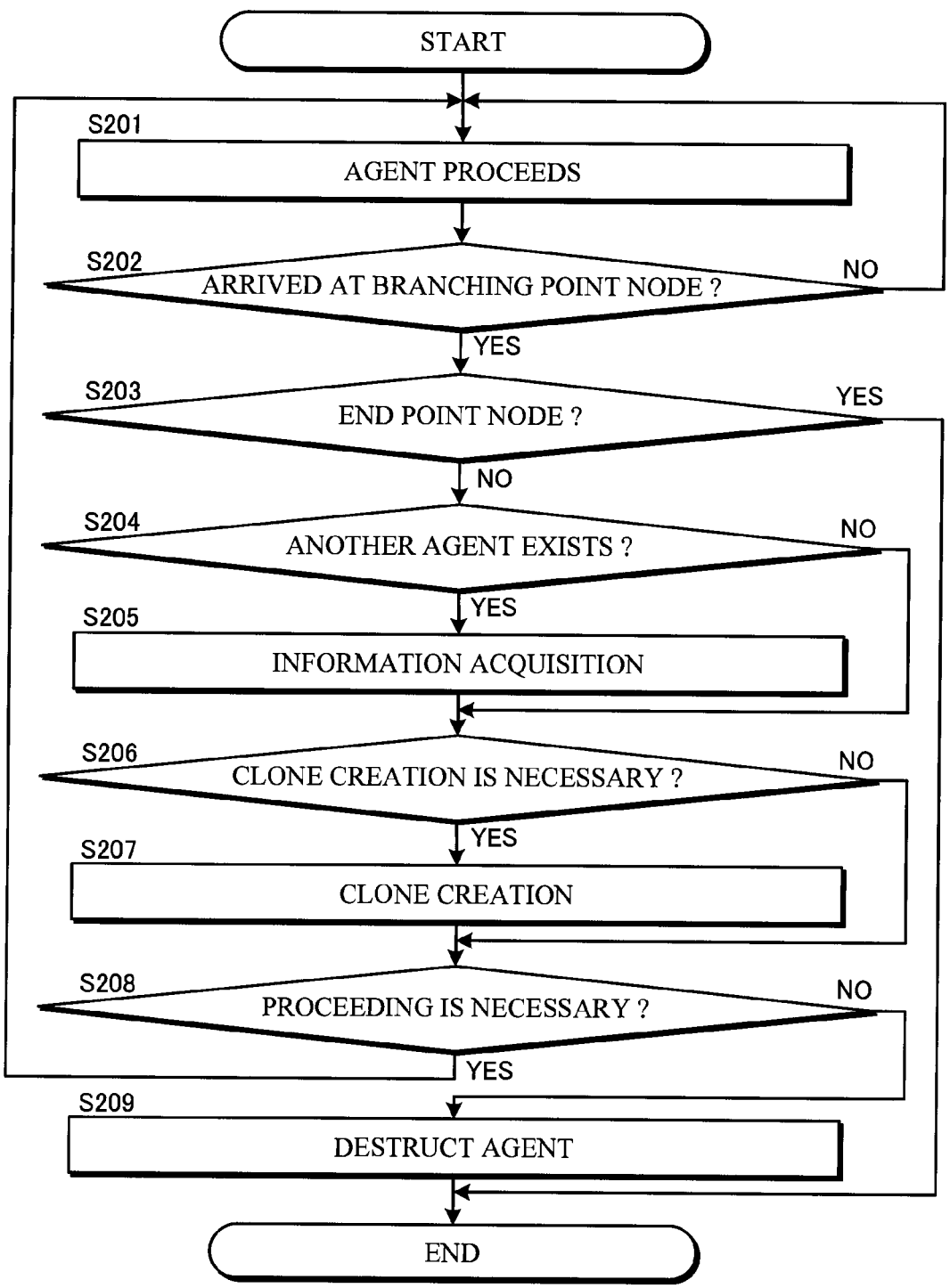
FIG. 54 is a flowchart showing the processing steps of the ninth embodiment.

Next, a ninth embodiment of the present invention will be explained by referring to the block diagram of FIG. 10, the schematic diagrams of FIGS. 30 through 42, and the flowchart of FIG. 54. Furthermore, components, which are the same as those of the first embodiment of FIG. 2, will be assigned the same reference numerals, but explanations of these components will be omitted, and only the different components will be explained.

That is, the ninth embodiment differs from the first embodiment in that agent-type searching means 21 is added to the optimum route searching portion 320 instead of search route card writing-type searching means 7. Agent-type searching means 21 is for creating a mobile agent and carrying out a route search using the characteristic features of the agent. The mobile agent, in response to a request from the user, can solve a problem by autonomously moving over data and the network to fulfill this request. Problem solving is realized by the agent reading in and interpreting a request, and arbitrarily reading out and executing the required program (either a module or a combination of modules). It is supposed that the user uses the input device 100 to input the request and program, and that this request and program are set in either the external storage device 200 or the internal storage device 400 beforehand.

Furthermore, in the above and following explanations, anthropomorphic representations are used for the sake of expediency in explaining the actions of the agent. However, in actuality, the agent itself is also a program (a module or combination of modules) executed by the computer. Therefore, when the agent is described as moving along a route, tracing, arriving at a node, and meeting (agents running into each other) at a node, this is actually processing that is carried out by accessing, referencing, and reading the necessary storage areas in the internal storage device 400 (or the external storage device 200), such as the memory of the computer.

Further, when the agent is described as storing information, this is an arbitrarily specified area that is secured in advance for the agent in either the external storage device 200 or the internal storage device 400. These characteristic features of the agent are the same for the agent manager and agent manager assistant described hereinbelow.

Figure 30:
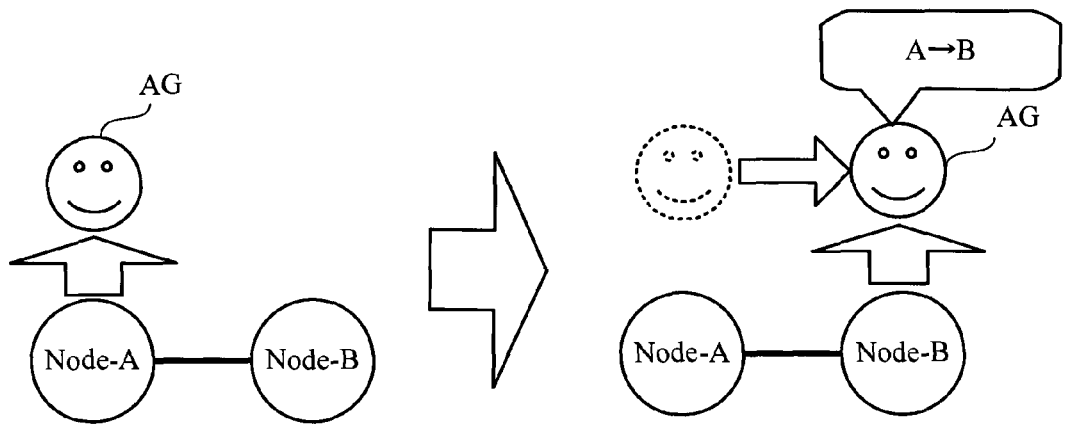
FIG. 30 is a diagram showing an example of the basic movement of an agent.

Agent-type searching means 21 of the ninth embodiment, for example, executes a search by moving an agent AG so as to transit through nodes on a cable laying route as shown in FIG. 30. The agent AG moves along the cable laying route to find a node, and upon arriving at a node, acquires the information of this node (name, coordinates, and so forth). Thus, the agent AG is set up so as to autonomously carry out search processing while storing information related to the routes and nodes it transits on its own.

Figure 31:
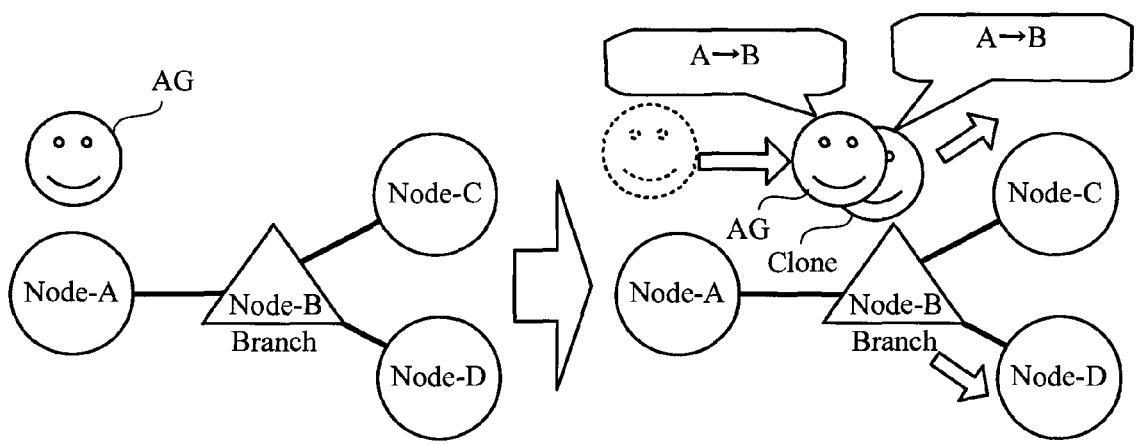
FIG. 31 is a diagram showing an example of the movement of the agent at the branching point.

Furthermore, the agent AG of this embodiment is set up as follows:

(1) When the agent AG arrives at a branching point, it creates an agent AG copy of itself (a clone), the two agents AG separate in the branching point and carry out route searches independently (multi-agent technology) as shown in FIG. 31.

(2) The clone agent AG possesses a copy of the original agent's AG information (transited route and nodes, destination node, and so forth).

(3) The original agent AG also possesses a copy of the clone agent's AG information (destination node and so forth).

(4) When a plurality of agents AG arrive at a common node, they transmit copies of their respective information (transited routes and nodes, destination nodes and so forth) to one another.

(5) An agent AG that comes to a dead-end node and an agent AG that is compelled to proceed along a route that another agent AG has already searched self-destruct.

(6) An agent AG will not create a clone agent AG when it comes across a branching point whose branch destination is already being searched by another agent AG.

(7) A cable laying route candidate is obtained in accordance with the information held by an agent AG that has made its way from the start point to the end point. A variety of functions may also be added to the agent AG, such as a function for determining the length of a route, and a function for comparing the route length against the length of another agent's AG route.

(8) The agent AG self-destructs in accordance with a pre-set condition.

(9-2. Operation)

The operation of the above-described ninth embodiment will be explained in accordance with the flowchart of FIG. 54, and by referring to FIGS. 32 through 42. Furthermore, the explanations of parts of the operation that are the same as those of the first embodiment will be omitted, and only the parts that are different will be explained.

Figure 32:
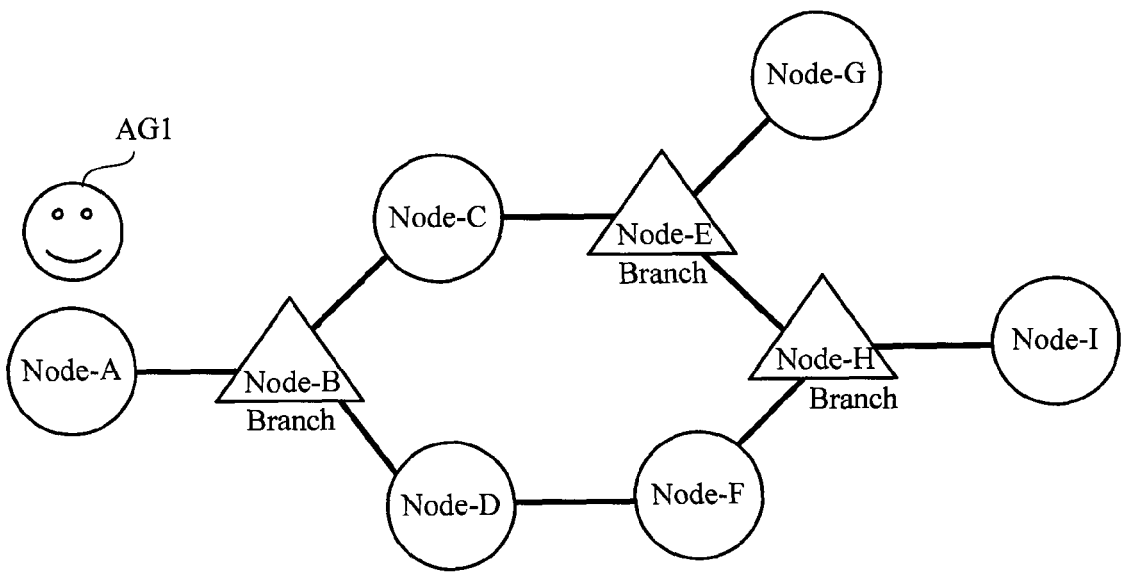
FIG. 32 is a diagram showing the start point of a search by the agent.
Figure 33:
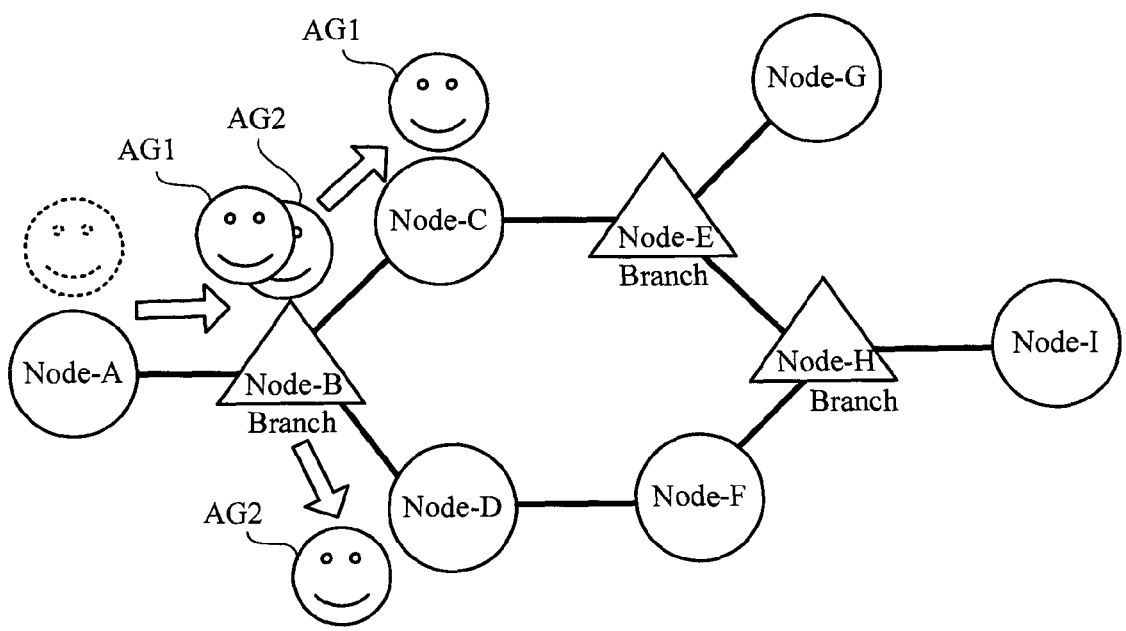
FIG. 33 is a diagram showing the creation of a clone by the agent.

An example of a search that targets nodes (Node-A is the start point, Node-I is the end point) that are connected as shown in FIG. 32 by agent-type searching means 21 will be explained here. First, when the search commences, the agent AG1 advances from Node-A, the start point node (Step 201). As shown in FIG. 33, upon arriving at branching point Node-B (Step 202), if this node is not the end point node (Step 203) and another agent AG is not at this node (Step 204), and a clone needs to be created (Step 206), the agent AG1 creates a clone agent AG2 (Step 207).

Figure 34:
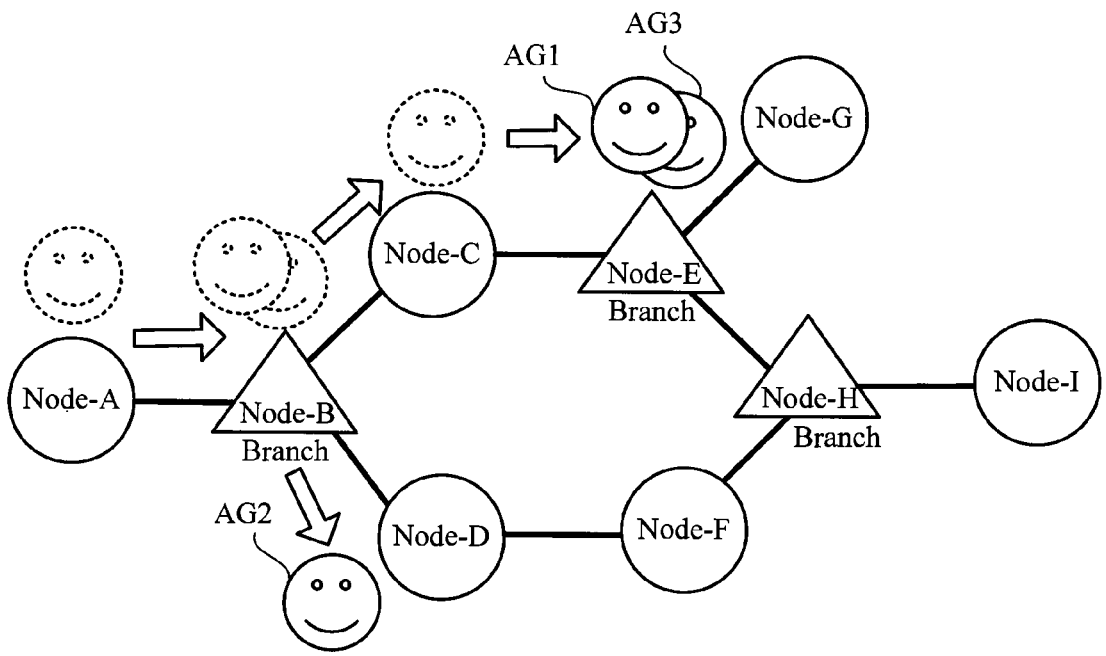
FIG. 34 is a diagram showing parallel search movements by a plurality of agents.

When there are nodes to which agent AG1 and agent AG2 have to proceed (Step 208), they carry out searching by each proceeding along a different route to search for optimum cable laying route candidates (Step 201). In addition, as shown in FIG. 34, upon arriving at branching point Node-E (Step 202), agent AG1 creates a clone agent AG3 (Steps 203, 204, 206, 207). This becomes the second clone that has been created.

Agent AG1 and agent AG3 carry out searching by proceeding along respectively different routes (Step 208, 201). Furthermore, while agent AG1 continues to move and search, agent AG2 is also carrying out a route search in parallel. In this way, the respective agents AG1, AG2, AG3 move and search independently.

Figure 35:
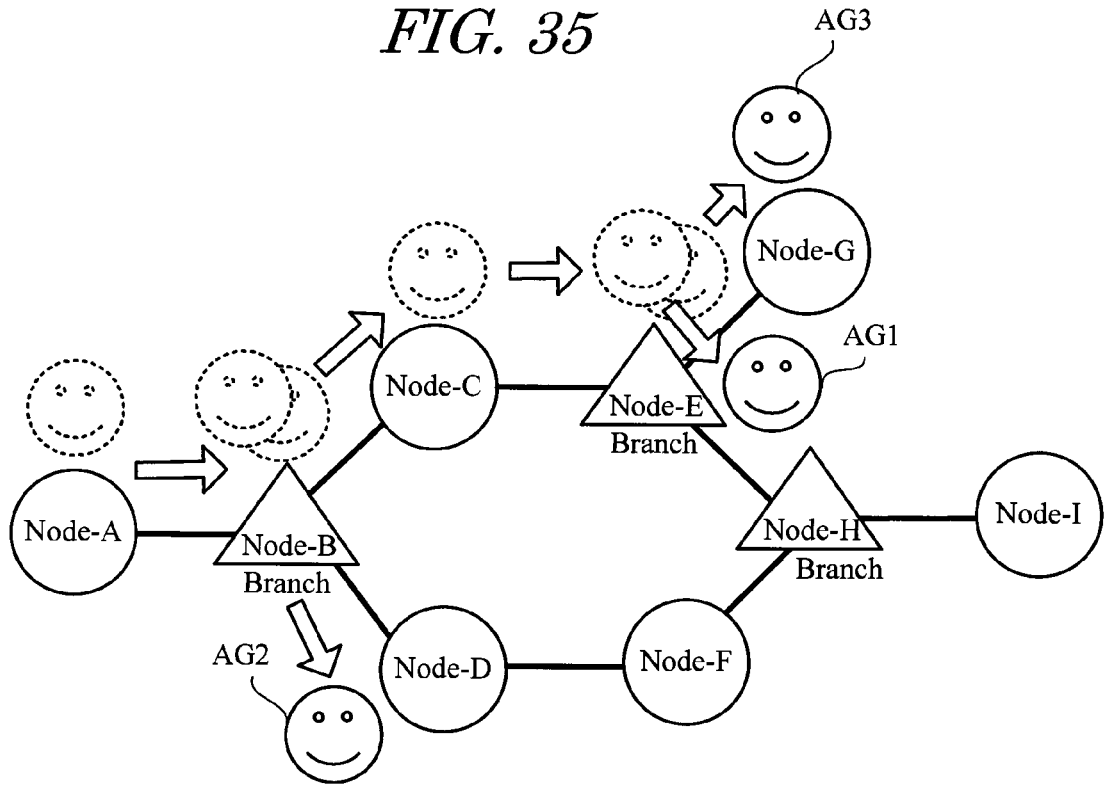
FIG. 35 is a diagram showing the self-destruction of the agent.

Next, as shown in FIG. 35, upon reaching Node-G (Step 202), agent AG 3 has no where else to go. Thus, agent AG3, having come to a dead-end node, which is not the end point node, determines that there is no need to proceed any further, and self-destructs (Steps 203, 204, 206, 208, 209). Furthermore, the other agent AG1 and agent AG2 are not aware that Node-G is a dead end. However, because agent AG1 knows that agent AG3 went to Node-G, agent AG1 will not go to this node.

Figure 36:
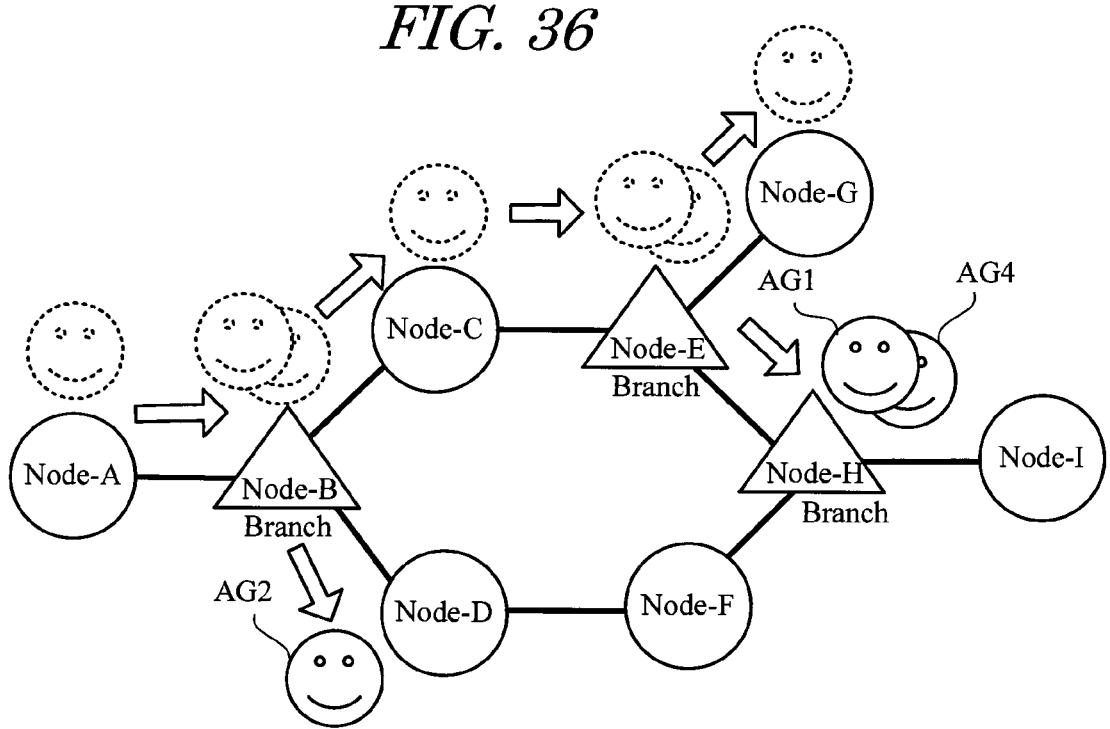
FIG. 36 is a diagram showing the creation of an agent clone.
Figure 37:
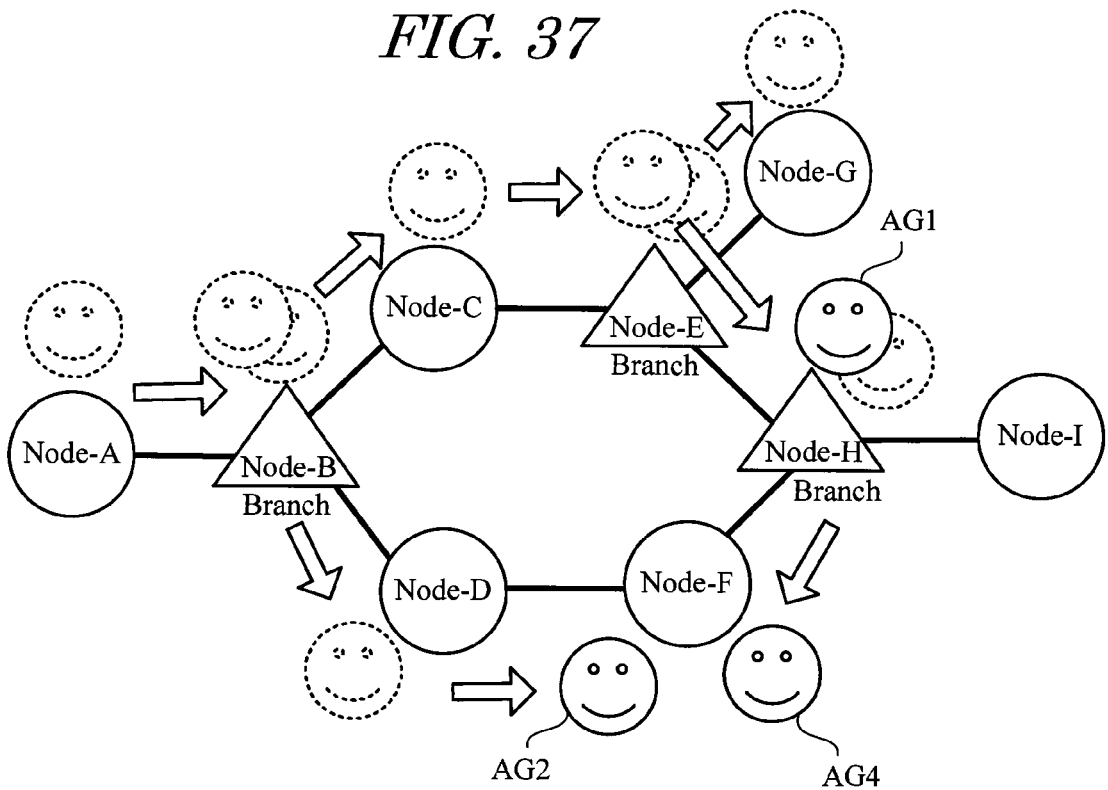
FIG. 37 is a diagram showing an agent collision.

Further, as shown in FIG. 36, upon reaching branching point Node-H (Step 202), agent AG1 creates a clone agent AG4 (Steps 203, 204, 206, 207). This becomes the third clone that has been created. Then, agent AG1 proceeds to Node-I, and agent AG4 proceeds to Node-F (Step 201). In so doing, as shown in FIG. 37, agent AG2 and agent AG4 arrive at Node-F together (Steps 202, 203, 204).

Agent AG2 and agent AG4 transmit (exchange) copies of the information that each possesses with one another at this time (Step 205). Agent AG4, based on the information received from agent AG2, determines that the route in the direction that it will proceed has already been transited by agent AG2, and since proceeding ahead as-is will simply search the same route in the reverse direction, agent AG4 self-destructs (Steps 206, 208, 209). In the meantime, agent AG2 proceeds to Node-H and continues searching (Steps 206, 208, 201).

Figure 38:
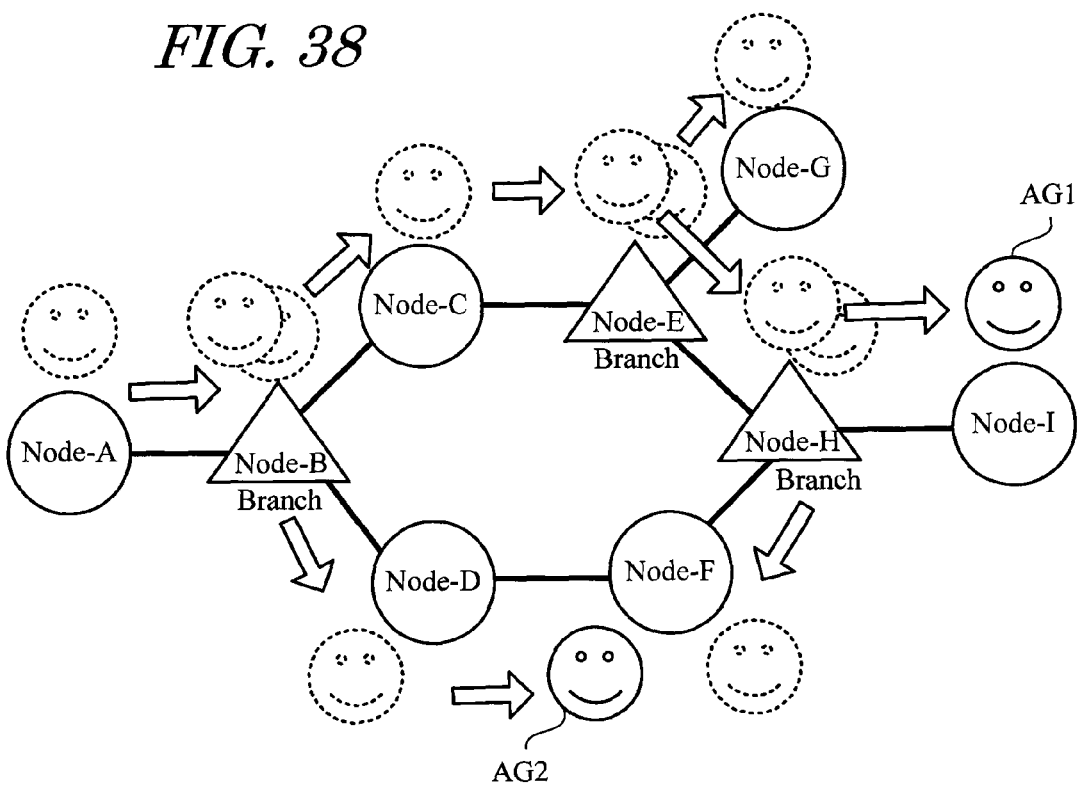
FIG. 38 is a diagram showing the arrival of the agent at the end point.
Figure 39:
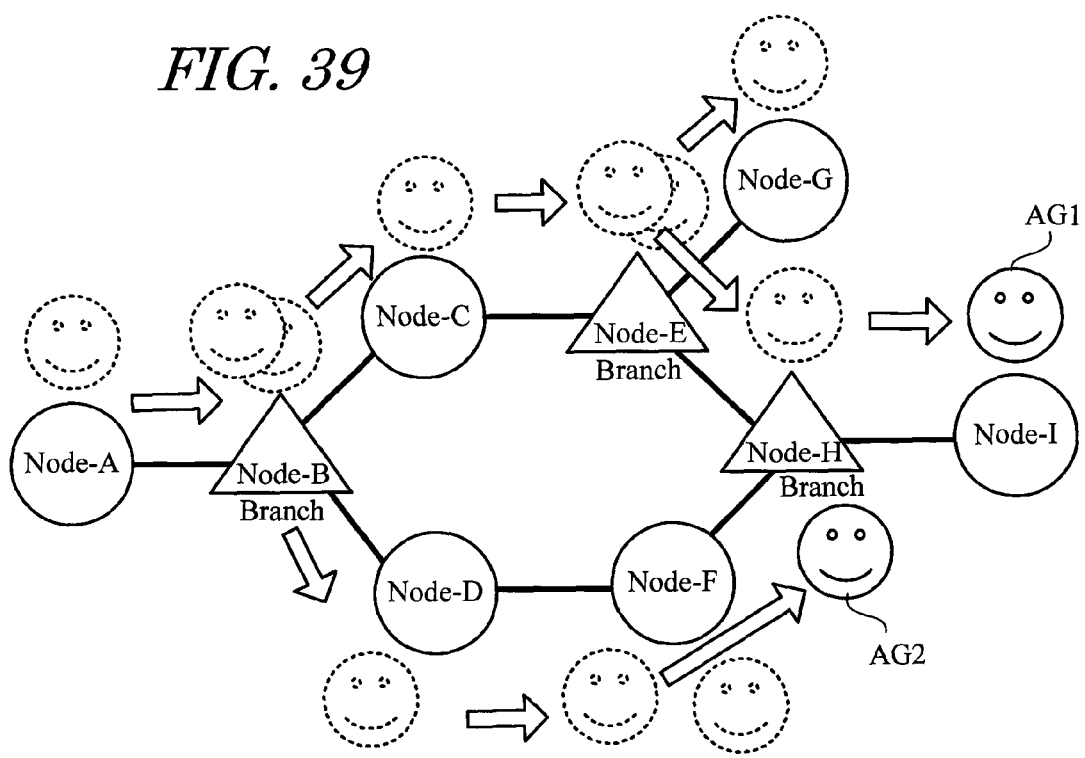
FIG. 39 is a diagram showing the arrival of the agent at a node through which another agent has transited.

FIG. 38 shows an example in which agent AG1 arrives at Node-I, which is the end point (Steps 202, 203). Further, FIG. 39 shows an example of agent AG2 arriving at Node-H (Step 202). Agent AG2 knows from the information received from agent AG4 that agent AG4 has already transited this route. In other words, because agent AG2 already knows the route beyond Node-E, it determines that there is no need to create a clone, and proceeds to the next node without creating a clone (Steps 203, 204, 206, 208).

Figure 40:
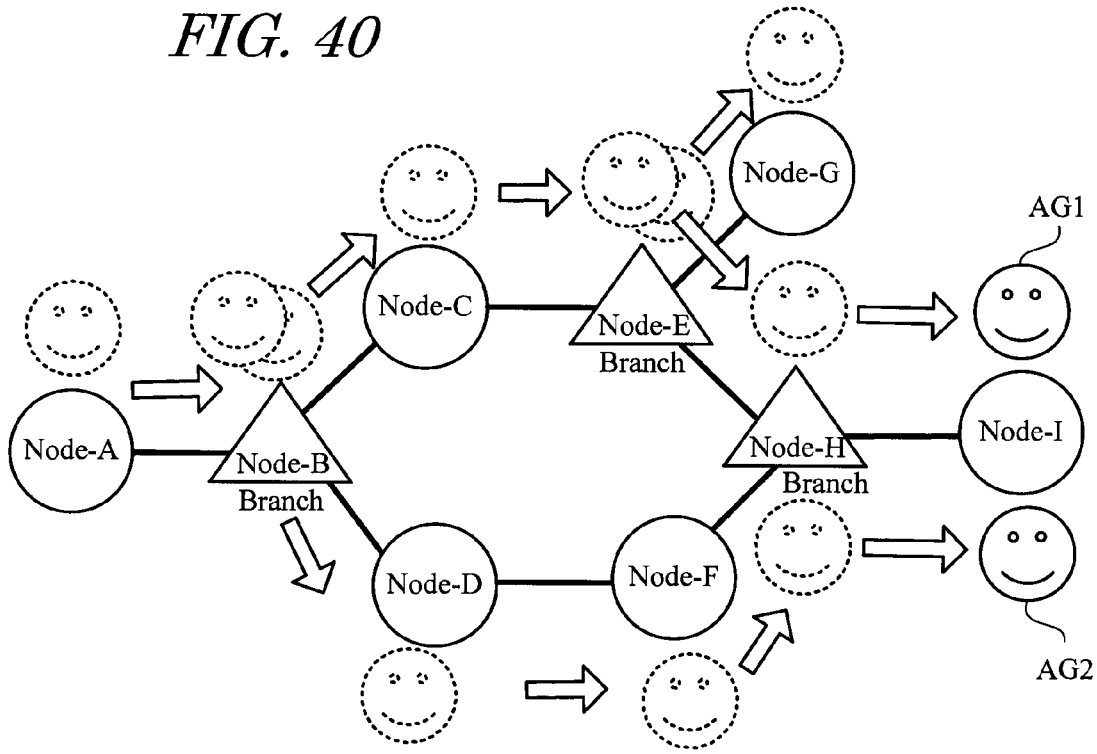
FIG. 40 is a diagram showing the arrival of two agents at the end point.

Furthermore, FIG. 40 shows an example in which agent AG2 also arrives at the end point after agent AG1 (Steps 201, 202, 203). Thus, due to the fact that agent AG1 and agent AG2 reached the end point, search termination determination means 8 determines that the search will be terminated. Then, agent-type searching means 21 determines cable laying route candidates based on the transited routes and nodes information possessed by agent AG1 and agent AG2, which have reached the end point. The same as in the first embodiment described hereinabove, route length calculation and other such processing is carried out based on the cable laying route candidates.

Furthermore, for example, it is also possible to determine and compare the route lengths held by agent AG1 and agent AG2, which made their ways from the start point to the end point, and to use the result of the agent with the shortest route length to determine the cable laying route candidate.

Furthermore, when there is a user desired condition setting, such as the specification of via points through which the cable laying route should pass, the agent AG that determines this condition has not been met self-destructs. It is supposed that the user uses the input device 100 to input this condition beforehand, and that this information is set in either the external storage device 200 or the internal storage device 400.

Furthermore, in the example described above, agent AG2 and agent AG4 ran into each other on Node-F.

Figure 41:
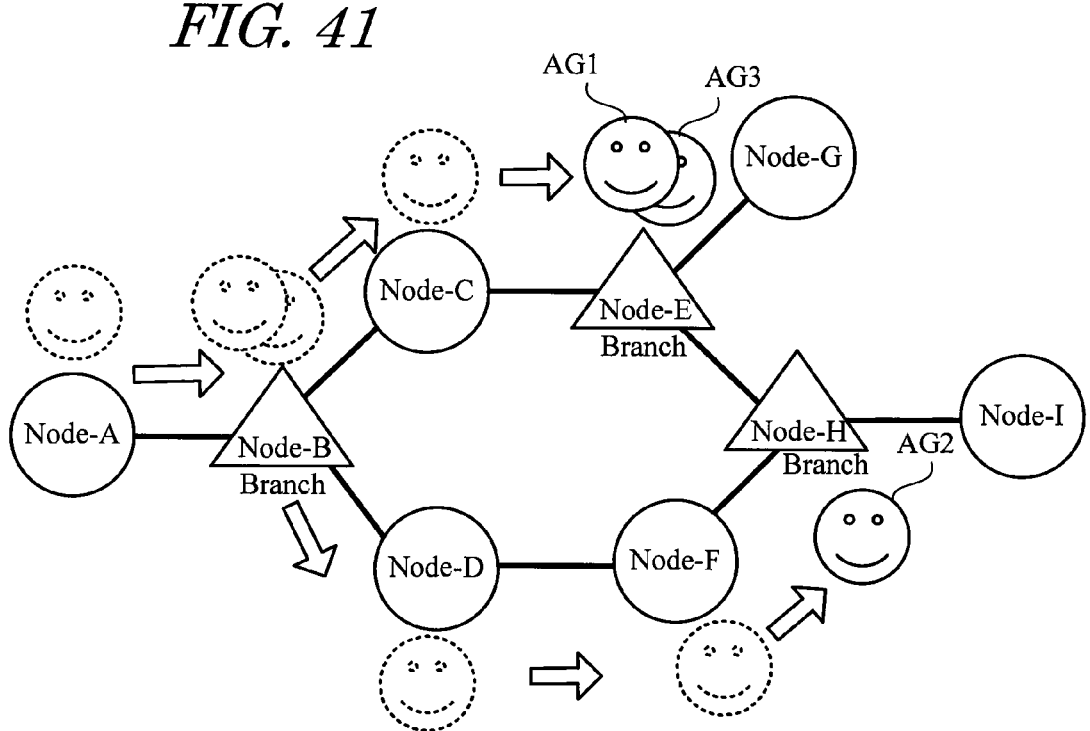
FIG. 41 is a diagram showing an agent arriving at a node ahead of another agent.

However, because the respective agents AG are each moving independently, as shown in FIG. 41, agent AG2 could also reach Node-H before another agent AG. In this case, it would not be necessary for agent AG1 to create clone agent AG4.

Figure 42:
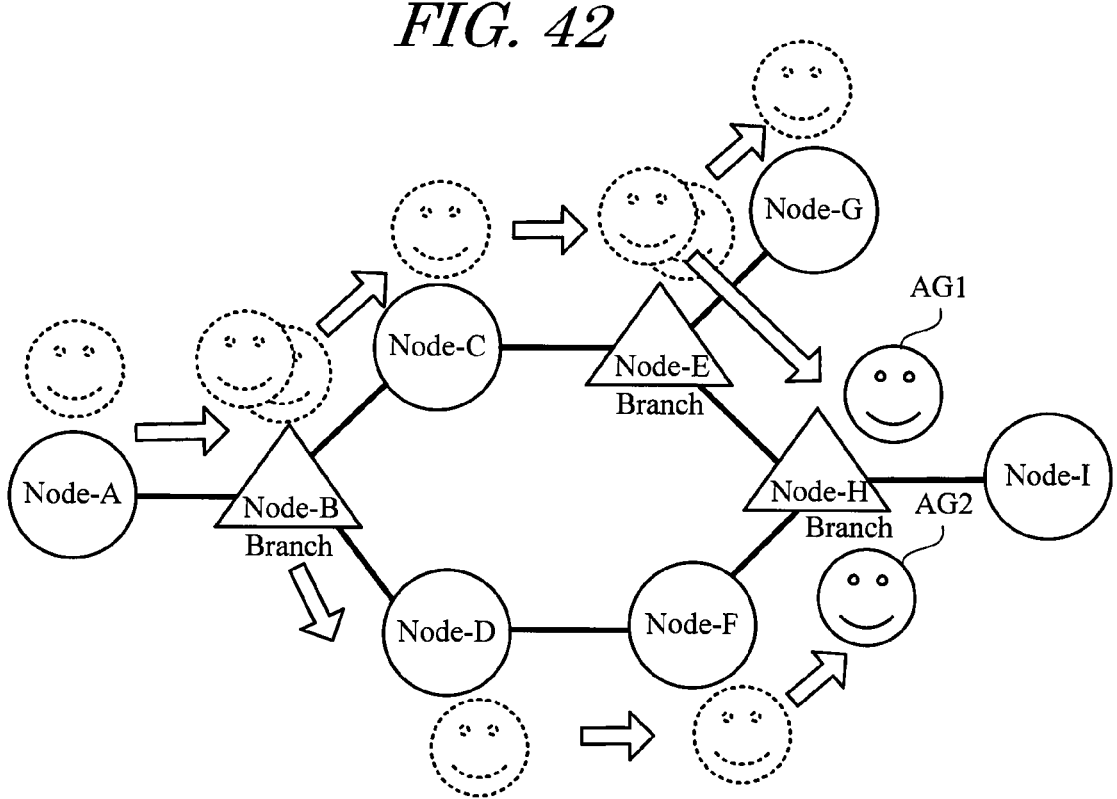
FIG. 42 is a diagram showing a case in which an agent does not create a clone.

Further, as shown in FIG. 42, agent AG2 could also reach Node-H before agent AG1 creates clone agent AG4 on Node-H. In this case, agent AG1 and agent AG2, by exchanging information with one another, will determine that searching has already been completed for the routes over which they respectively transited.

Therefore, agent AG1 and agent AG2 will not create new clones in this case.

(9-3. Effect)

According to the above-described ninth embodiment, the agent AG moves freely over a route, creates a clone, and each agent AG carries out searching independently.

The agents AG also possess cooperativeness such as the exchanging of information with one another. Thus, since a plurality of agents AG is independently and parallelly carrying out searches, search time can be shortened more than in a Tree search.

Further, because an agent AG, upon arriving at a dead-end node, determines on its own that it is no longer needed and self-destructs, the maximum value for resource usage may be held in check. Based on the above, this embodiment makes it possible to shorten processing time, and to lessen the loads on the memory and CPU, thereby preventing a computer freeze.

(10. Tenth Embodiment)

(10-1. Configuration)

Figure 11:
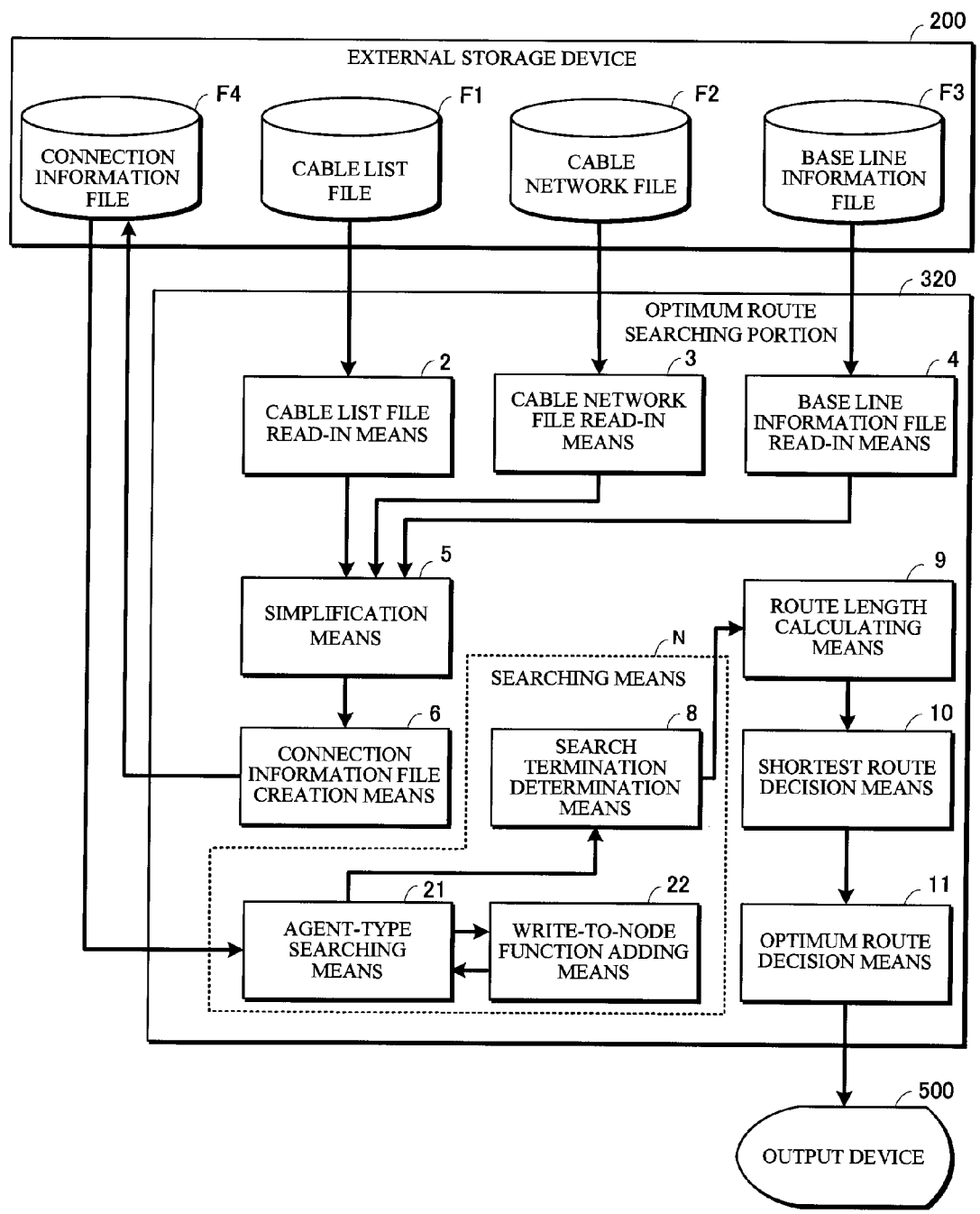
FIG. 11 is a block diagram showing a tenth embodiment of the optimum route searching apparatus of the present invention.

Next, a tenth embodiment of the present invention will be explained by referring to the block diagram of FIG. 11 and the schematic diagrams of FIGS. 43 and 44. Furthermore, components, which are the same as those of the ninth embodiment of FIG. 10, will be assigned the same reference numerals, but explanations of these components will be omitted, and only the different components will be explained.

That is, the tenth embodiment differs from the ninth embodiment in that write-to-node function adding means 22 is added to the optimum route searching portion 320. Write-to-node function adding means 22 is for adding an object-oriented function for writing the information held by the respective agents AG to the nodes that have been transited. However, the location of the information written in by an agent AG is actually a node-associated area in the external storage device 200 or internal storage device 400.

(10-2. Operation)

The operation of the tenth embodiment having the above-described configuration will be explained. Furthermore, explanations of the parts of the operation that are the same as those of the ninth embodiment will be omitted, and only the different parts will be explained.

That is, write-to-node function adding means 22 adds a function for writing information to the respective nodes to each agent AG that carries out searching like that indicated in the above-described ninth embodiment.

Figure 43:
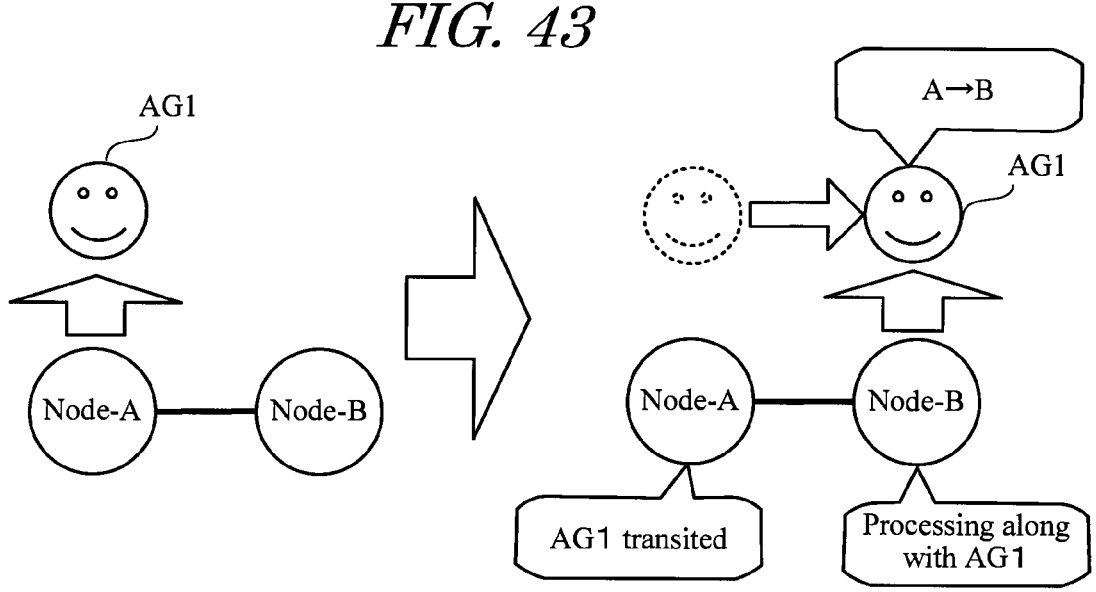
FIG. 43 is a diagram showing an information write to a node by the agent.

For example, as shown in FIG. 43, the agent AG not only obtains information from the respective nodes that it transits, but also writes to each node information that the pertinent agent AG already possesses, the fact that the pertinent agent AG has transited the node, the fact that the pertinent agent AG is engaged in processing on the node, and the node to which the pertinent agent AG will proceed.

Consequently, the respective agents AG, upon arriving at the respective nodes, can access information regarding an agent AG that transited the pertinent node earlier. Therefore, an agent AG, based on the information obtained from the respective nodes, can determine which node to proceed to, whether or not to create a clone agent AG, and whether or not to self-destruct.

Figure 44:
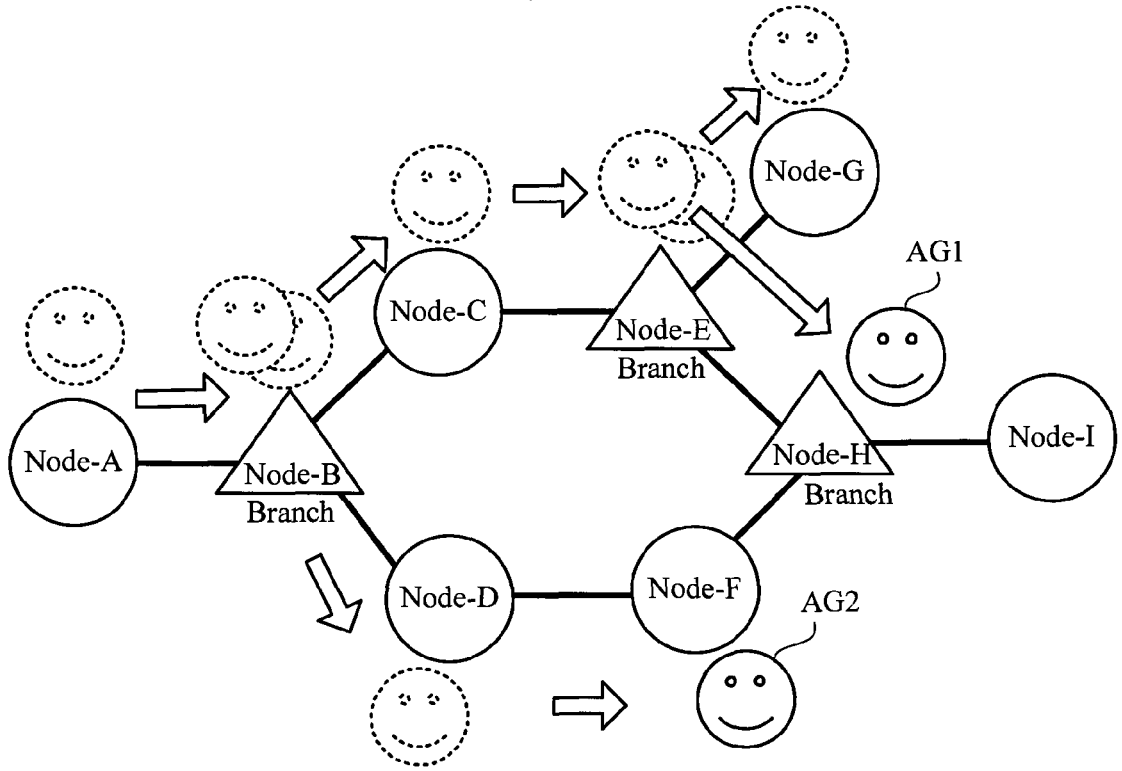
FIG. 44 is a diagram showing a case in which the agent did not create a clone.

In particular, as shown in FIG. 44, agent AG1, upon arriving at Node-H, can write to Node-H information, such as the route information up to Node-H and the node at which a clone was created, even though agent AG1 did not create clone agent AG4 at Node-H due to a discrepancy of one sort or another.

In so doing, when agent AG2 arrives at Node-H, agent AG2 reads the information that agent AG1 has written to Node-H, making it possible for agent AG2 to create an agent AG in place of the clone agent AG4 that agent AG1 should have created. However, in the example shown in FIG. 44, agent AG2 may not always create a clone agent AG upon reaching Node-H.

(10-3 Effect)

According to this embodiment described hereinabove, also furnishing the nodes with various information, for example, information on the results of the agent's AG search up until that point, makes it possible for a substitute agent AG to read the information of a node, and continue the route search by reviewing the next destination, creating a clone, and so forth even when an agent AG exhibits an abnormality, or an agent AG self-destructs. Therefore, it is possible to obtain the same results as those at normal times without interrupting processing.

(11. Eleventh Embodiment)

(11-1. Configuration)

Figure 12:
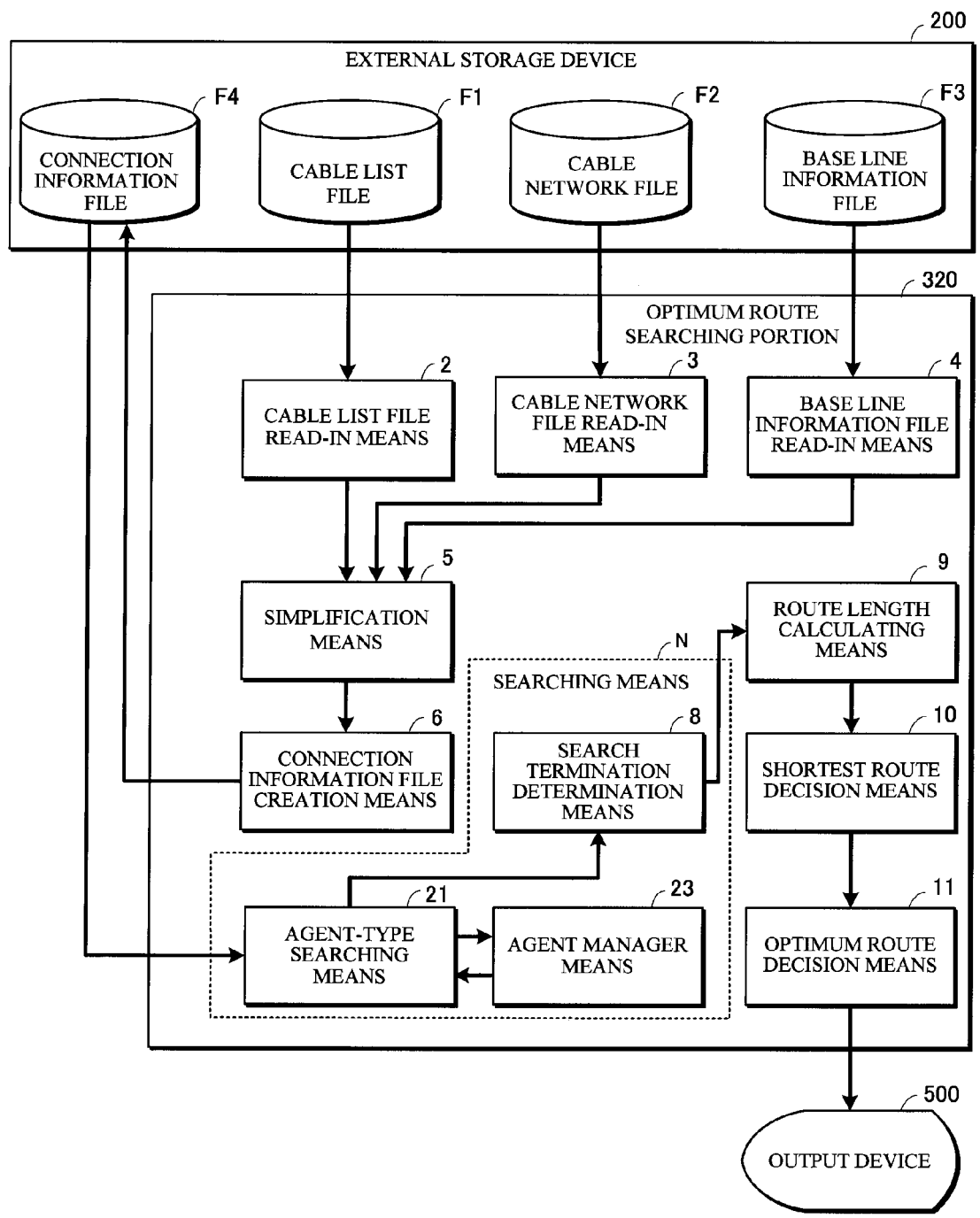
FIG. 12 is a block diagram showing an eleventh embodiment of the optimum route searching apparatus of the present invention.

Next, an eleventh embodiment of the present invention will be explained by referring to the block diagram of FIG. 12 and the schematic diagram of FIG. 45. Furthermore, components, which are the same as those of the ninth embodiment of FIG. 10, will be assigned the same reference numerals, but explanations of these components will be omitted, and only the different components will be explained.

That is, this embodiment differs from the ninth embodiment in that agent manager means 23 is added to the optimum route searching portion 320. Agent manager means 23 is for using an agent manager to monitor the activities of the respective agents, such as the creation, destruction and current location of the respective agents AG. This agent manager is also a type of agent, and is set up to independently collect monitoring information from the respective agents AG, and to transmit monitoring information to the other agents AG.

(11-2. Operation)

The operation of the eleventh embodiment having the above-described configuration will be explained. Furthermore, explanations of the parts of the operation that are the same as those of the ninth embodiment will be omitted, and only the different parts will be explained.

Figure 45:
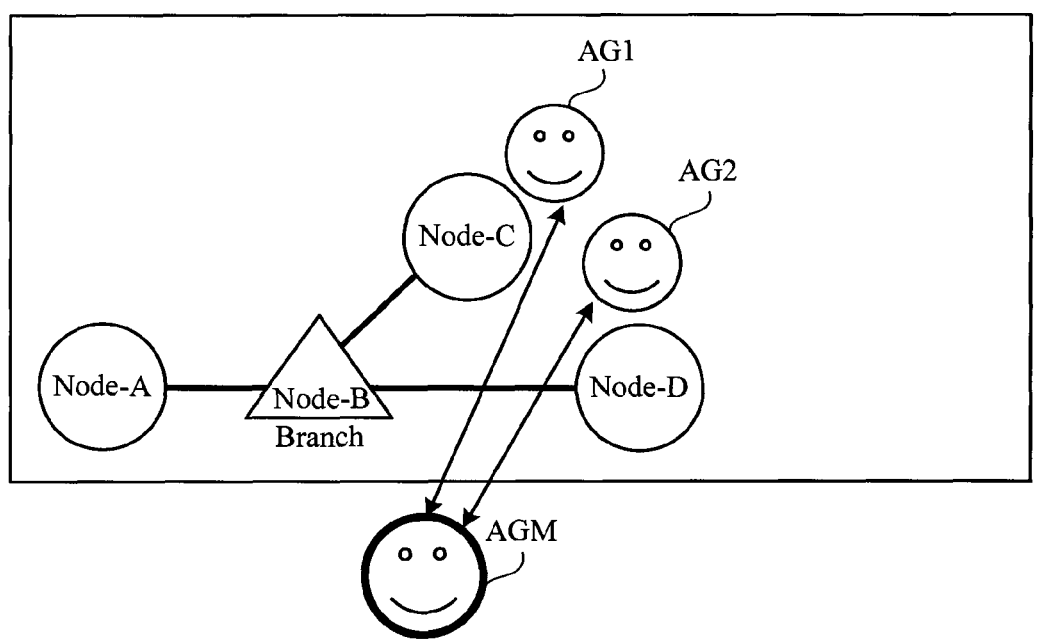
FIG. 45 is a diagram showing the monitoring of an agent by an agent manager.

That is, as shown in FIG. 45, agent manager means 23 monitors the respective agents AG by having an agent manager AGM collect information such as the creation, destruction and current location of each agent AG. This information comprises the number of agents, and the routes that the agents have transited. By managing all of this information, the agent manager AGM is aware of the progress of the respective agents, the time that has passed since an agent was created, and so forth.

Further, agent manager means 23 executes processing that has the agent manager AGM sequentially inform the respective agents AG about the information collected from the other agents AG, such as what each agent AG has done (created a clone, self-destructed, and so forth) and where (what node) the agent AG has done it. Consequently, the respective agents AG can hold the same information as the agent manager AGM.

(11-3. Effect)

According to this embodiment described hereinabove, the respective agents AG can carry out searching while holding common information collected by the agent manager AGM from all the agents AG, thereby reducing wasted effort and making possible more efficient searching than when agents AG exchange information when they meet, or when the respective agents AG read and write information from and to nodes when transiting the nodes.

For example, it makes it possible to conserve memory by destroying an agent AG that is engaging in a useless activity or a clone agent AG whose time has elapsed, and preventing an agent AG that is in the process of searching from carrying out uncalled for movement or creating unnecessary clones by obtaining dead-end information using the route information obtained prior to the self-destruction of an agent AG that reached a dead end.

Further, for example, this embodiment also makes it possible for an agent AG to make a determination not to create a clone or advance to a specific node by obtaining the information of another agent AG prior to the agent AG meeting the other agent AG at a node, and prior to the agent AG reading the information of the other agent AG from the node. Therefore, it becomes possible to shorten processing time and reduce the loads on the memory and CPU, thereby preventing a computer freeze.

(12. Twelfth Embodiment)

(12-1. Configuration)

Figure 13:
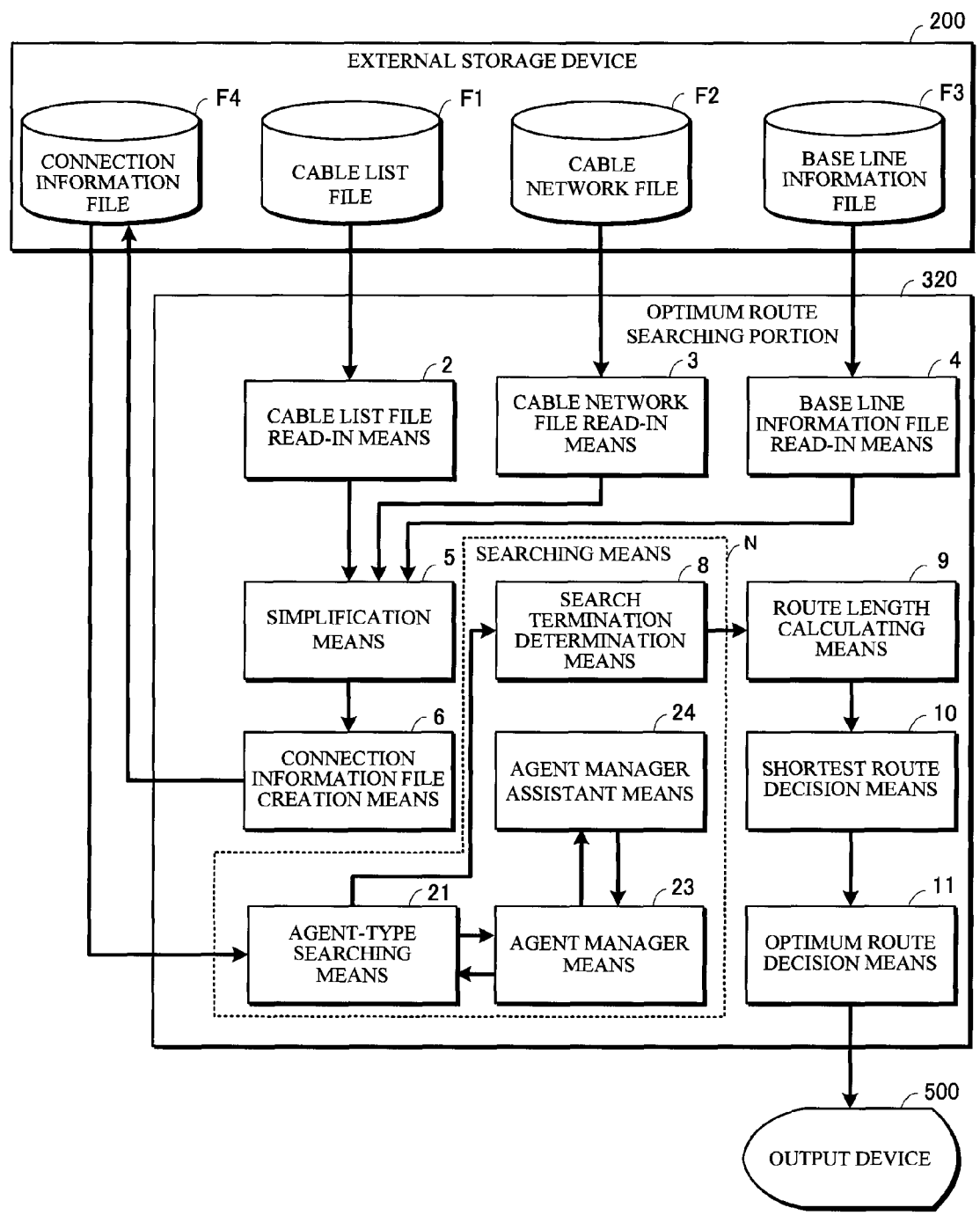
FIG. 13 is a block diagram showing a twelfth embodiment of the optimum route searching apparatus of the present invention.

Next, a twelfth embodiment of the present invention will be explained by referring to the block diagram of FIG. 13 and the schematic diagram of FIG. 46. Furthermore, components, which are the same as those of the eleventh embodiment of FIG. 12, will be assigned the same reference numerals, but explanations of these components will be omitted, and only the different components will be explained.

That is, the twelfth embodiment differs from the eleventh embodiment in that agent manager assistant means 24 is added to the optimum route searching portion 320. Agent manager assistant means 24 is for creating a clone of the agent manager (an agent manager assistant). This agent manager assistant is also a type of agent, and is set up to notify monitoring information to the original agent manager while attaching to and moving together with the respective agents.

(12-2. Operation)

The operation of the twelfth embodiment having the above-described configuration will be explained. Furthermore, explanations of the parts of the operation that are the same as those of the eleventh embodiment will be omitted, and only the different parts will be explained.

Figure 46:
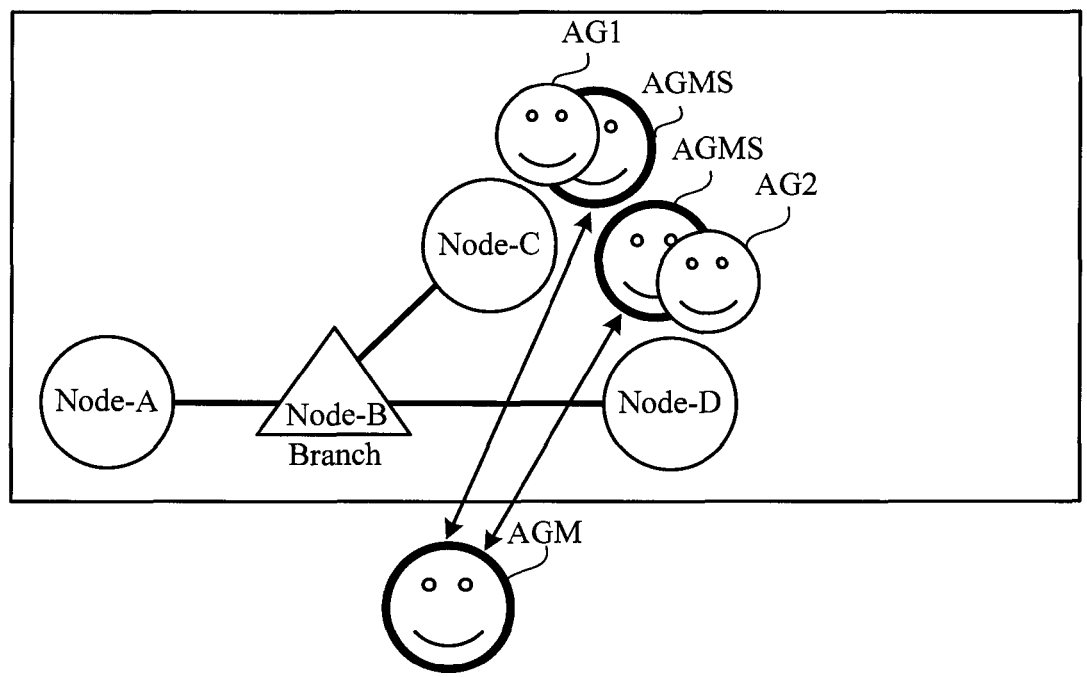
FIG. 46 is a diagram showing the monitoring of an agent by an agent manager assistant.

That is, as shown in FIG. 46, agent manager assistant means 24 creates an agent manager assistant AGMS, which is a clone of the agent manager AGM. In addition, agent manager assistant means 24 creates an agent manager assistant AGMS for each agent AG clone that is created. The created agent manager assistants AGMS attach to and move together with the respective agents AG, and sequentially notify respective agent monitoring information to the agent manager AGM. The agent manager AGM sequentially notifies the information obtained from each of agent manager assistants AGMS to the other agent manager assistants AGMS.

(12-3. Effect)

According to this embodiment described hereinabove, the respective agents AG can carry out searching while sharing common information simultaneously collected in parallel from all the agents AG by agent manager assistants AGMS attached to each agent AG, thereby reducing the time lag in information collection among the respective agents AG, making possible efficient searching with even less wasted effort. Therefore, it is possible to shorten processing time and reduce the loads on the memory and CPU, thereby preventing a computer freeze.

(13. Thirteenth Embodiment)

(13-1. Configuration)

Figure 14:
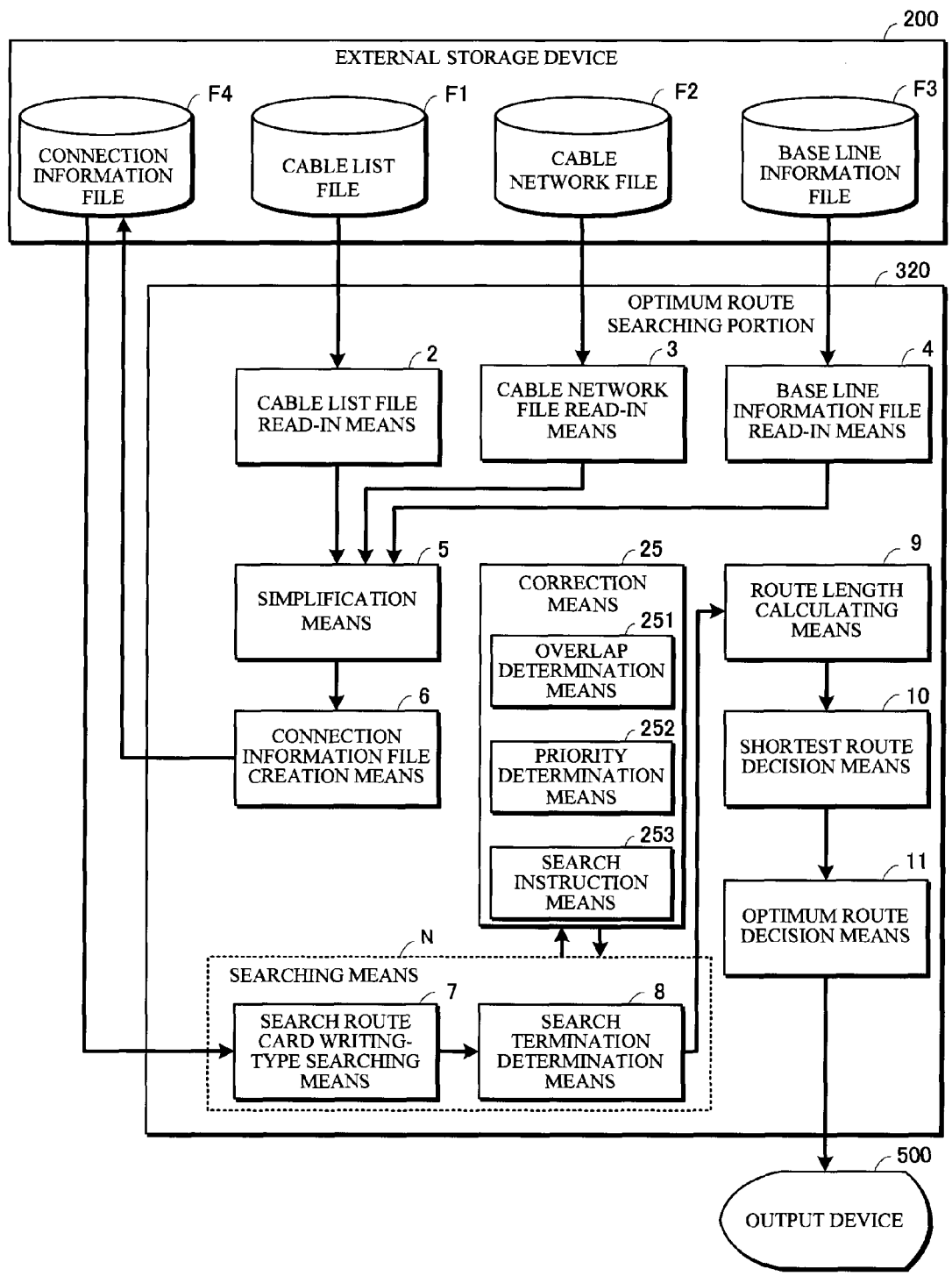
FIG. 14 is a block diagram showing a thirteenth embodiment of the optimum route searching apparatus of the present invention.
Figure 55:
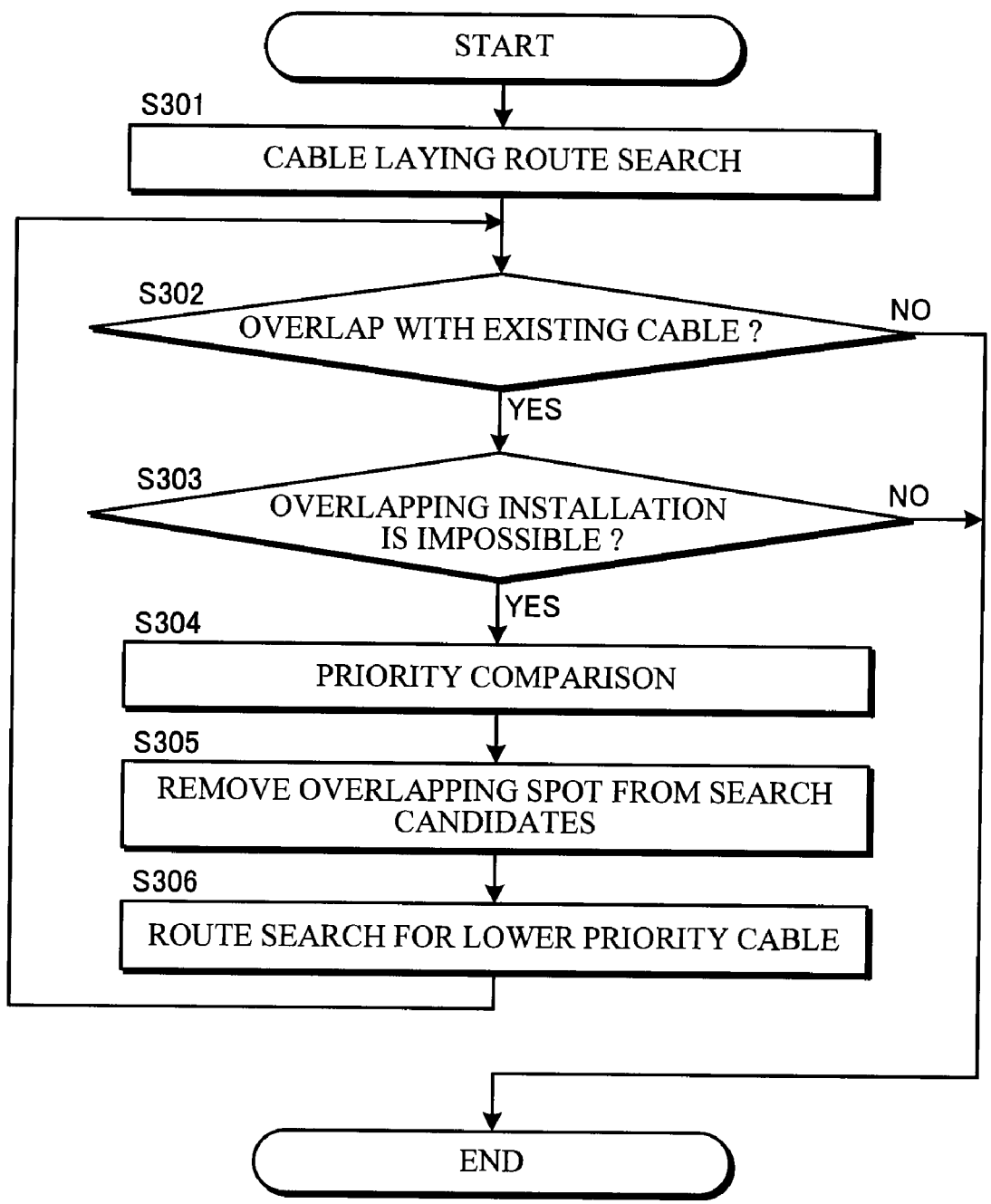
FIG. 55 is a flowchart showing the processing steps of the thirteenth embodiment.

Next, a thirteenth embodiment of the present invention will be explained by referring to the block diagram of FIG. 14, the schematic diagrams of FIGS. 47 through 52 and the flowchart of FIG. 55. Furthermore, components, which are the same as those of the first embodiment of FIG. 2, will be assigned the same reference numerals, but explanations of these components will be omitted, and only the different components will be explained.

That is, the thirteenth embodiment differs from the first embodiment in that correction means 25 is added to the optimum route searching portion 320. Correction means 25 is for carefully considering information related to the cable and cable tray, and causing searching means N to carry out a search for a new cable laying route, and has overlap determination means 251, priority determination means 252, and search instruction means 253.

When a search reveals that a plurality of cables will be overlappingly laid in a single cable tray, overlap determination means 251 is for determining whether or not an overlapping installation like this is possible. Priority determination means 252 is for comparing cable priorities. Search instruction means 253 is for causing searching means N to carry out a search that excludes from the search targets a cable tray route for which overlapping installation is not possible.

It is supposed that the information related to the cable and the cable tray include at a minimum the cable laying location and space factor of the cable tray, and the priorities and cross-sectional sizes of an existing cable and a new cable.

It is supposed that the user has used the input device 100 to input this information beforehand, and that this information has been set in either the external storage device 200 or the internal storage device 400. However, a portion of the information may also be obtained from the cable list file F1, cable network file F2 and base line information file F3.

(13-2. Operation)

The operation of the thirteenth embodiment having the above-described configuration will be explained. Furthermore, explanations of the parts of the operation that are the same as those of the first embodiment will be omitted, and only the different parts will be explained.

That is, correction means 25 functions when a route included among the cable laying route candidates subsequent to a search by search route card writing-type searching means 7 shares a cable tray T with an existing cable C. In this case, correction means 25 makes a determination based on the space factor of the cable tray T and the cross-section size of the cable C, and when only one of the cables C can fit in the cable tray T, compares the priorities of the existing cable C and the new cable C, and changes the route of the cable C having the lower priority to an acceptable route.

Figure 47:
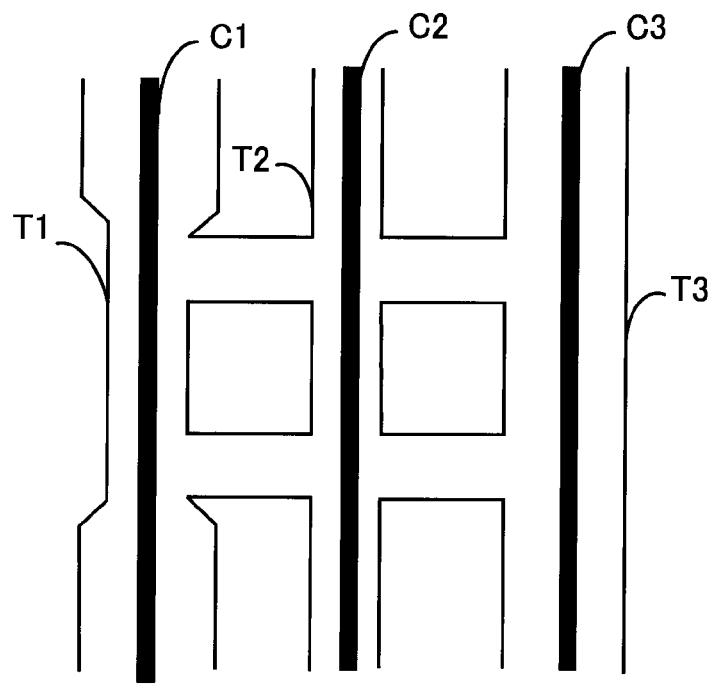
FIG. 47 is a diagram showing an example of a cable laid in a cable tray.

An example of processing by correction means 25 such as this will be explained in accordance with the schematic diagrams of FIGS. 47 through 52 and the flowchart of FIG. 54. First, as shown in FIG. 47, it is supposed that search results indicating that cables C1 through C3 are installed in cable trays T1 through T3 has already been obtained. On this premise, it is supposed that the user has used the input device 100 to input a request in advance to pass a new cable C4 through cable tray T1 and that this request has been set in either the external storage device 200 or the internal storage device 400. It is supposed that the priorities of these cables C1 through C4 have been set as C4>C1>C2=C3.

Figure 48:
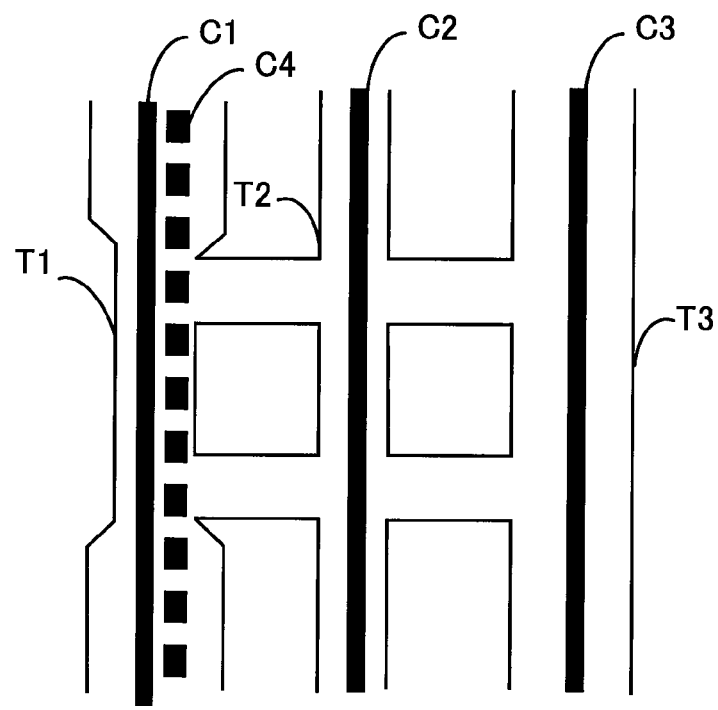
FIG. 48 is a diagram showing an example of the additional laying of a new cable.

When a route search is carried out for the new cable C4 by searching means N under these circumstances, a cable laying route candidate via which the new cable C4 passes through cable tray T1 is obtained as shown in FIG. 48 (Step 301). The new cable C4 is indicated by the broken line in FIG. 48.

Because the existing cable C1 is in the cable tray T1, cable C1 and cable C4 will overlap (Step 302). However, based on the space factor and cross-sectional sizes of the cables C1 and C4, and the fact that cable tray T1 is narrow, overlap determination means 251 determines that overlappingly passing cables C1 and C4 through the cable tray T1 will not be possible under the current conditions (Step 303). Accordingly, priority determination means 252 compares the priority of the new cable C4 against that of the existing cable C1, and determines that cable C4 has a higher priority (Step 304).

Figure 49:
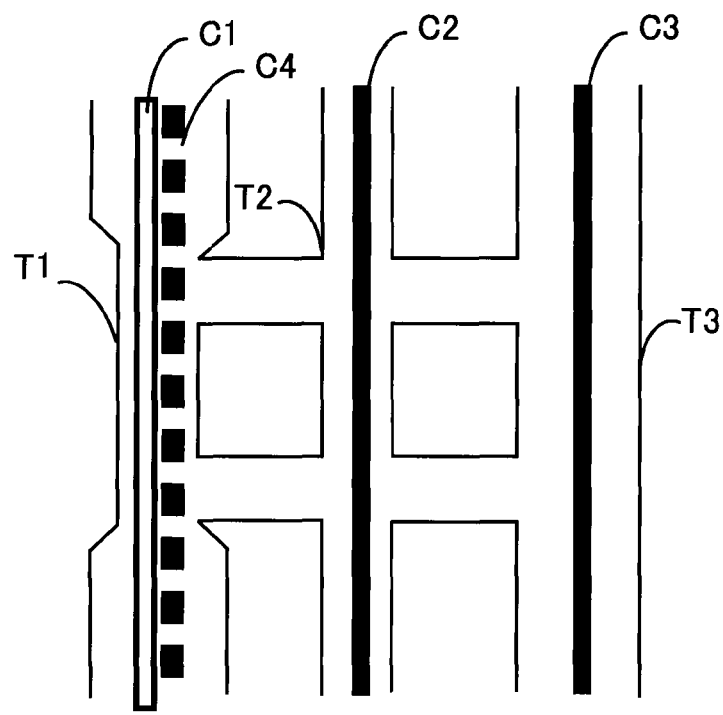
FIG. 49 is a diagram showing a cable to be moved.
Figure 50:
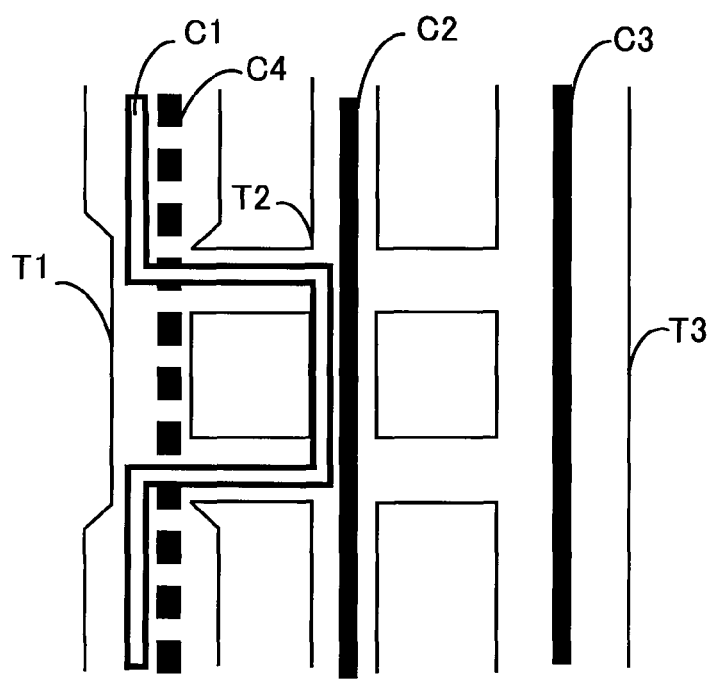
FIG. 50 is a diagram showing a cable that has been moved to an adjacent tray.

Then, search instruction means 253 removes the overlapping cable tray T1 route from the search candidates (Step 305), and instructs searching means N to search once again for an optimum cable laying route for the lower priority cable C1 (Step 306). The existing cable C1, which is to be moved, is indicated in FIG. 49 here using a white line. As a result of this, as shown in FIG. 50, a route by which cable C1 passes through cable tray T2 is determined.

Because existing cable C2 is in the cable tray T2, cable C2 and cable C1 will overlap (Step 302). However, based on the space factor and cross-sectional sizes of the cables C1 and C2, overlap determination means 251 determines that overlappingly passing both cables C1 and C2 through the cable tray T2 will not be possible under the current conditions (Step 303). Accordingly, priority determination means 252 compares the priority of cable C1, which is to be moved, against that of existing cable C2, and determines that cable C1 has a higher priority (Step 304).

Figure 51:
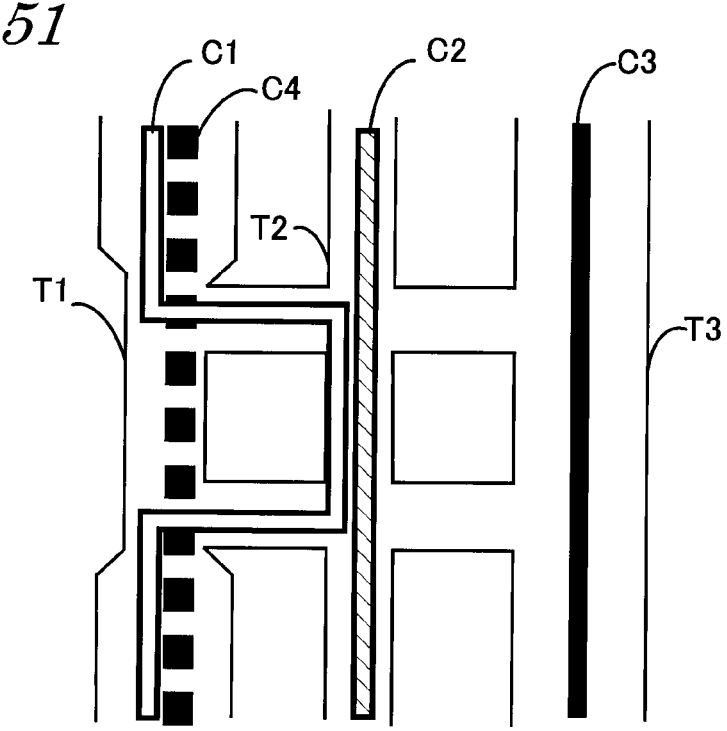
FIG. 51 is a diagram showing a cable to be moved.
Figure 52:
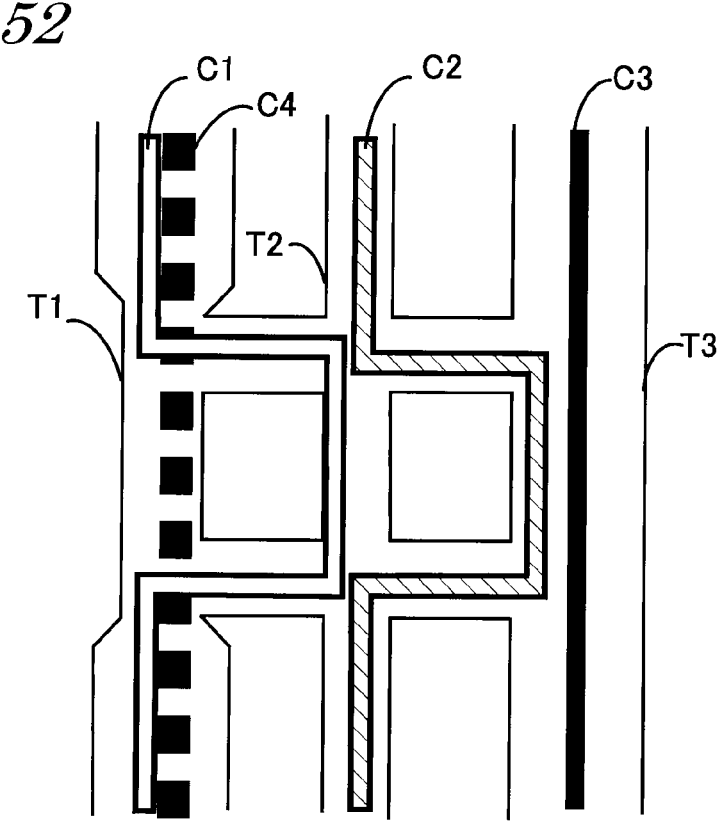
FIG. 52 is a diagram showing a cable that has been moved to an adjacent tray.

Then, search instruction means 253 removes the overlapping cable tray T2 route from the search candidates (Step 305), and instructs searching means N to search once again for an optimum cable laying route for the lower priority cable C2 (Step 306). Existing cable C2, which is to be moved, is indicated in FIG. 51 here using a diagonally striped white line. As a result of this, as shown in FIG. 52, a route by which cable C2 passes through cable tray T3 is determined.

Cable C2 and cable C3 will overlap here in cable tray T3 (Step 302). However, based on the space factor and cross-sectional sizes of the cables C2 and C3, overlap determination means 251 determines that both cables C2 and C3 will be able to overlappingly pass through cable tray T3 (Step 303). Therefore, the processing by correction means 25 ends at this point.

(13-3. Effect)

According to this embodiment described hereinabove, changing the cable laying locations of the cables C as if playing billiards in accordance with cable C priorities makes it possible to determine optimum routes for the cables C. Consequently, post-design and post-cable laying corrections make it possible to determine an optimum cable laying route with greater precision.

(14. Other Embodiments)

The present invention is not limited to the embodiments described hereinabove. For example, the inventions described in the respective claims may be freely combined in various ways. In the embodiments described hereinabove, the second through the seventh embodiments sequentially add features to the embodiment previous thereto, the eighth through the twelfth embodiments only make changes to searching means N of the first embodiment, and the thirteenth embodiment adds correction means 25 to the first embodiment.

However, either all or a portion of start/end point resetting means 13, via point passage checking means 14, space factor checking means 15, stop condition checking means 16, longest distance between two points checking means 17, optimum route next candidate searching means 18 and correction means 25 may be combined in any way desired with searching means N of the respective embodiments. Furthermore, in the above-describe embodiments, the configuration can be such that simplification means is omitted, or means for simplifying in accordance with steps that differ from those in the above-described embodiments is used.

Further, a housing member for housing a cable includes a wide range of things that can generally be used, such as a conduit other than a cable tray. Also, no distinction is made between the types of cable targeted by the present invention (for example, may also comprise fibre optic cable). The present invention may also be used to lay long objects other than a cable (for example, piping).

Further, the agent is also able to carry out processing like that described hereinabove by moving over a network when the computers and search data storage media for realizing the present invention are distributively arranged via a network. Furthermore, the characteristic features of an ordinary agent may include autonomy, cooperativeness, mobility, activeness, robustness (ability to adapt to the environment), sociability, intelligence, individuality, and teachability. In the above-described embodiments, the technology makes use of autonomy and cooperativeness, but an agent may also redundantly be given the characteristic features of other agents.

Furthermore, the present invention may also be understood as a search method that carries out an optimum route search in accordance with a program that causes a computer to operate using steps such as those presented in the respective claims and respective embodiments described hereinabove, and, in addition, may also be understood as a computer program for searching, which causes a computer to operate in accordance with these steps, and a recording medium for recording this program.

The invention claimed is:

1. An optimum route searching apparatus for searching for an optimum cable laying route, comprising:
   search data storage means for storing search data comprising information related to a route that has a node as a connection point;
   simplification means for creating simplified data by extracting, from among the information related to the route, information related to a node constituting a branching point, a bending point and a terminal point;
   connection information creation means for creating route connection information based on the simplified data; and
   searching means for searching for an optimum cable laying route candidate based on the connection information,
   wherein the searching means has:
     search route card writing-type searching means; and
     search termination determination means, and
   the search route card writing-type searching means has:
     card creation means for creating a card into which sequentially connected nodes are written; and
     card writing means for writing to the card a route of interconnected nodes from a start point to either an end point or a dead end, and
   the search termination determination means determines search termination for all routes in accordance with the route of interconnected nodes from the start point to either the end point or the dead end having been written to all cards by the card writing means.

2. The optimum route searching apparatus according to claim 1, further comprising:
   start/end point resetting means; and
   decision criteria storage means for storing decision criteria for deciding a node nearest to an area,
   wherein the start/end point resetting means has:
     determination means for determining, in a search by the searching means, whether or not a node constituting either the start point or the end point exists in an area;
     decision means for deciding the node nearest the area based on the decision criteria when the determination means has determined that a node constituting either the start point or the end point does not exist in the area; and
   setting means for setting the nearest node decided by the decision means as either the start point or the end point of the search by the searching means.

3. The optimum route searching apparatus according to claim 1, further comprising:
   via point storage means for storing a via point that a cable laying route is to pass through and the order in which the cable laying route is to pass through the via point; and
   via point passage checking means for checking whether or not a cable laying route candidate searched by the searching means passes through the via point in the order.

4. The optimum route searching apparatus according to claim 1, further comprising:
   housing member information storage means for storing housing member information comprising a space factor of a housing member in which a cable is housed on the cable laying route;

cable information storage means for storing cable information comprising a cross-sectional area of the cable to be laid; and space factor checking means for checking, based on the housing member information and the cable information, whether or not a housing member on a cable laying route candidate searched by the searching means is able to house the cable.

5. The optimum route searching apparatus according to claim 1, further comprising:

stop condition storage means for storing a stop condition to stop a search; and stop condition checking means for checking whether or not the search by the searching means meets the stop condition.

6. The optimum route searching apparatus according to claim 1, further comprising:

convergence condition storage means for storing a convergence condition for the longest distance between two points in a cable laying route candidate; and longest distance between two points checking means for checking, based on the convergence condition, whether or not the longest distance between two points of a cable laying route candidate has converged during the search by the searching means.

7. The optimum route searching apparatus according to claim 1, further comprising:

optimum route next candidate searching means; and decision criteria storage means for storing decision criteria for deciding a node nearest an area, wherein the optimum route next candidate searching means has:

decision means for deciding, based on the decision criteria, either a node nearest to the start point area or a node nearest to the end point area of a cable laying route candidate; and search-again instruction means for causing a search to be carried out by the searching means with the nearest node decided by the decision means as either the start point or the end point.

8. The optimum route searching apparatus according to claim 1, wherein the search data comprises information related to cable priority, and the optimum route searching apparatus further comprises correction means for correcting, based on the priority, a cable laying route searched by the searching means.

9. An optimum route searching method for searching for an optimum cable laying route using a computer, comprising:

the computer being provided with search data storage means, simplification means, connection information creation means, and searching means, the search data storage means storing search data comprising information related to a route having a node as a connection point;

the simplification means extracting, from among the information related to the route, information related to a branching point node, a bending point node, and a terminal point node;

the connection information creation means creating route connection information based on the simplified data; and the searching means searching for an optimum cable laying route candidate based on the connection information, wherein the searching means has:

search route card writing-type searching means; and search termination determination means, and the search route card writing-type searching means has:

card creation means; and card writing means, the card creating means creating a card into which sequentially connected nodes are written; and the card writing means writing to the card a route of interconnected nodes from a start point to either an end point or a dead end, and the search termination determination means determining search termination for all routes in accordance with the route of interconnected nodes from the start point to either the end point or the dead end having been written to all cards by the card writing means.

10. A recording non-transitory medium that has an optimum route searching program recorded therein, wherein the optimum route searching program is executable by a computer to search for an optimum cable laying route, the program causing the computer to execute the steps of:

storing search data comprising information related to a route having a node as a connection point;

extracting, from among the information related to the route, information related to a branching point node, a bending point node, and a terminal point node;

creating route connection information based on simplified data; and searching for an optimum cable laying route candidate based on the connection information, wherein the searching comprises:

search route card writing-type searching; and search termination determination searching, and the search route card writing-type searching comprises:

creating a card into which sequentially connected nodes are written; and writing to the card a route of interconnected nodes from a start point to either an end point or a dead end, and wherein the search termination determination searching determines search termination for all routes in accordance with the route of interconnected nodes from the start point to either the end point or the dead end having been written to all cards by the card writing.

* * * * *